United States Patent
Lee et al.

(10) Patent No.: US 11,882,370 B2
(45) Date of Patent: Jan. 23, 2024

(54) CAMERA MODULE HAVING A TILTABLE FILTER

(71) Applicant: LG INNOTEK CO., LTD., Seoul (KR)

(72) Inventors: Chang Hyuck Lee, Seoul (KR); Young Kil Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 139 days.

(21) Appl. No.: 17/420,771

(22) PCT Filed: Jan. 6, 2020

(86) PCT No.: PCT/KR2020/000169
§ 371 (c)(1),
(2) Date: Jul. 6, 2021

(87) PCT Pub. No.: WO2020/145588
PCT Pub. Date: Jul. 16, 2020

(65) Prior Publication Data
US 2022/0116537 A1    Apr. 14, 2022

(30) Foreign Application Priority Data
Jan. 7, 2019  (KR) .......................... 10-2019-0001890

(51) Int. Cl.
*H04N 5/335*   (2011.01)
*H04N 23/951*  (2023.01)
(Continued)

(52) U.S. Cl.
CPC .......... *H04N 23/951* (2023.01); *G02B 7/006* (2013.01); *G06T 3/4053* (2013.01); *H04N 23/55* (2023.01); *H04N 23/56* (2023.01); *G01S 17/894* (2020.01)

(58) Field of Classification Search
CPC .................................................... G06T 3/4053
See application file for complete search history.

(56) References Cited

U.S. PATENT DOCUMENTS 4,967,264 A * 10/1990 Parulski ................. H04N 1/195
348/456
5,087,809 A *  2/1992 Jackson ................. H04N 25/48
250/226
(Continued)

FOREIGN PATENT DOCUMENTS

JP   2013-025035 A   2/2013
KR   10-2014-0094927 A   7/2014
(Continued)

*Primary Examiner* — Gary C Vieaux
(74) *Attorney, Agent, or Firm* — Birch, Stewart, Kolasch & Birch, LLP

(57) ABSTRACT

A camera module according to the present embodiment includes a light emitting part configured to output a light signal to an object, a filter configured to allow the light signal to pass therethrough, at least one lens disposed on the filter and configured to collect the light signal from the object, a sensor configured to generate an electric signal from the light signal collected by the lens, the sensor including a plurality of pixels arranged in an array form, and a tilting part configured to tilt the filter to repeatedly move an optical path of the light signal having passed through the filter according to a predetermined rule. The optical path of the light signal passing through the filter is moved in one direction among diagonal directions of the sensor with respect to an optical path corresponding to the filter being disposed parallel to the sensor.

19 Claims, 22 Drawing Sheets

(51) Int. Cl.
*G02B 7/00* (2021.01)
*G06T 3/40* (2006.01)
*H04N 23/55* (2023.01)
*H04N 23/56* (2023.01)
*G01S 17/894* (2020.01)

(56) References Cited

U.S. PATENT DOCUMENTS

| | | | |
|---|---|---|---|
| 11,568,553 B2 * | 1/2023 | Kim | G02B 5/208 |
| 2005/0073728 A1 * | 4/2005 | Sakaguchi | H04N 1/19515 |
| | | | 358/497 |
| 2011/0108708 A1 * | 5/2011 | Olsen | H04N 23/40 |
| | | | 250/208.1 |
| 2017/0127036 A1 * | 5/2017 | You | H04N 23/56 |
| 2019/0104239 A1 * | 4/2019 | Aschwanden | H02K 41/0356 |

FOREIGN PATENT DOCUMENTS

| | | |
|---|---|---|
| KR | 20150105694 A * | 9/2015 |
| KR | 10-1629610 B1 | 6/2016 |
| KR | 10-2017-0050058 A | 5/2017 |
| KR | 10-2018-0000964 A | 1/2018 |

* cited by examiner

[FIG. 1]
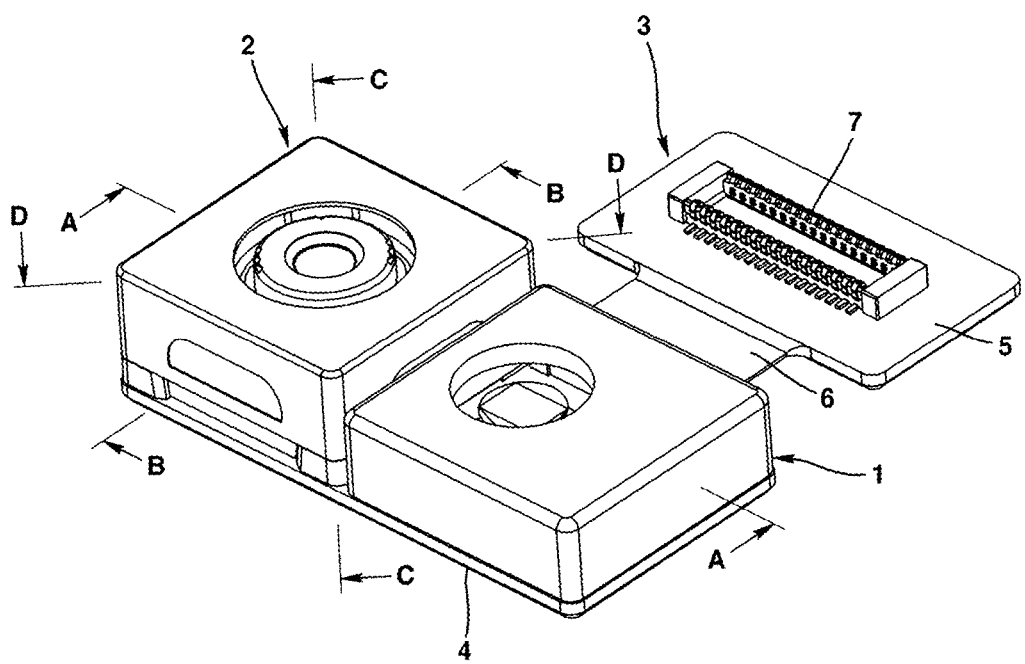

[FIG.2]
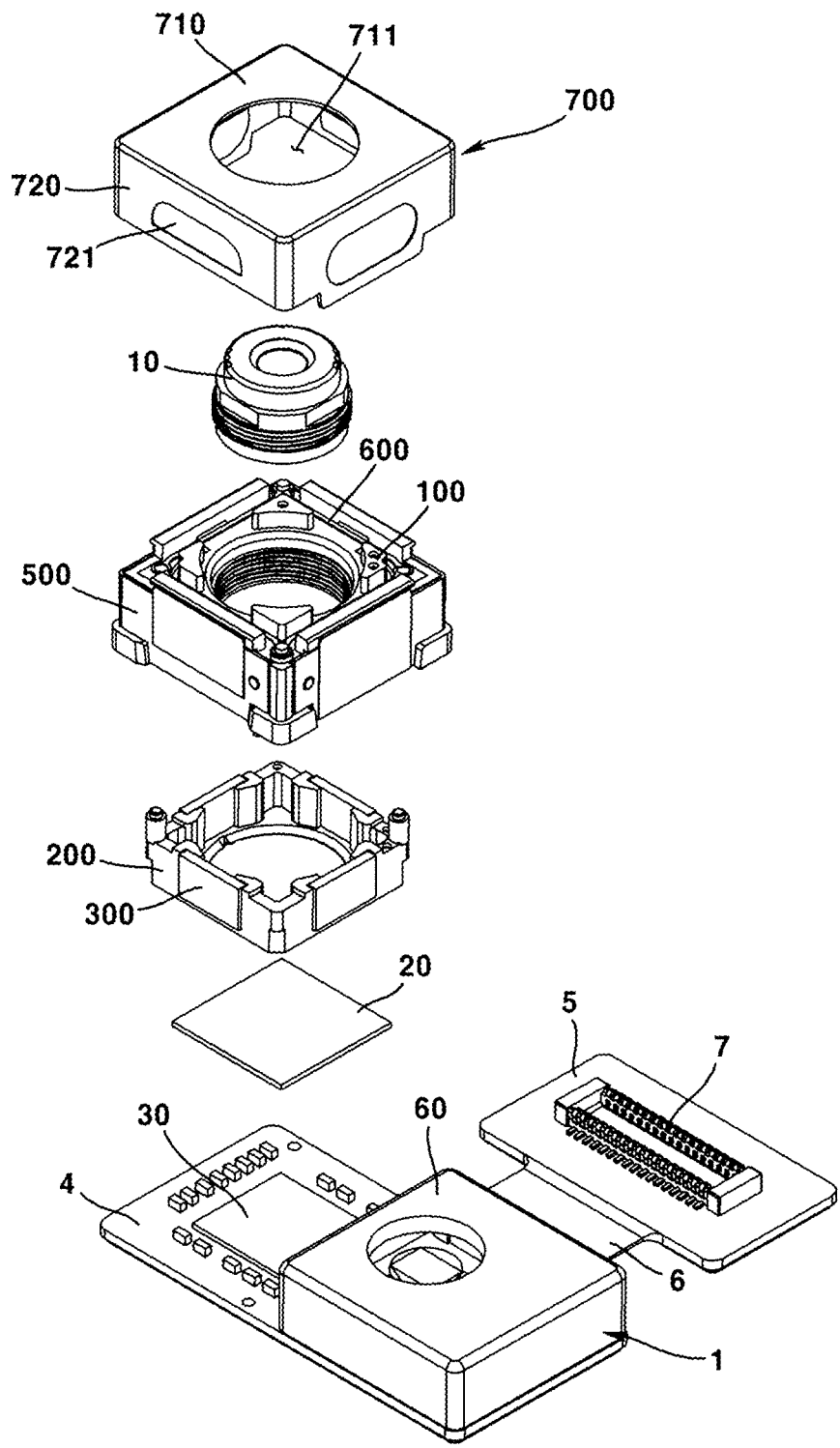

[FIG.3a]
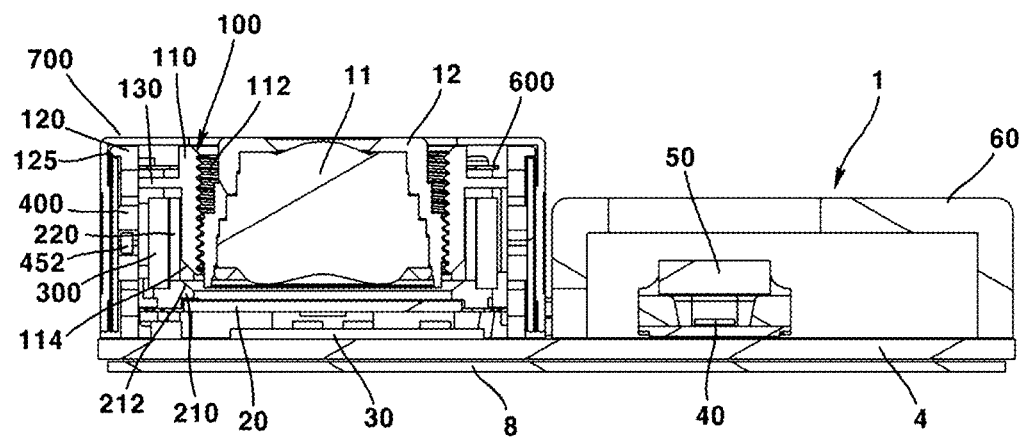
[FIG.3b]
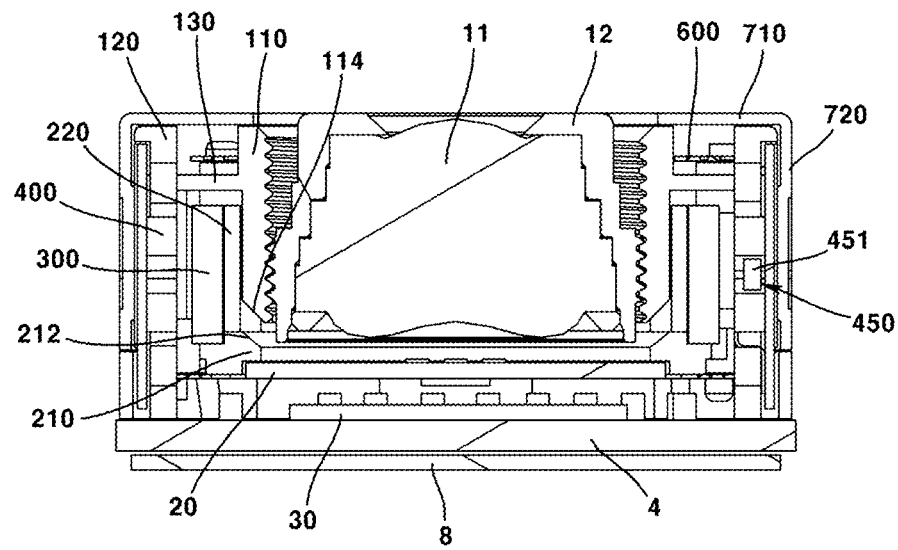

[FIG.4a]
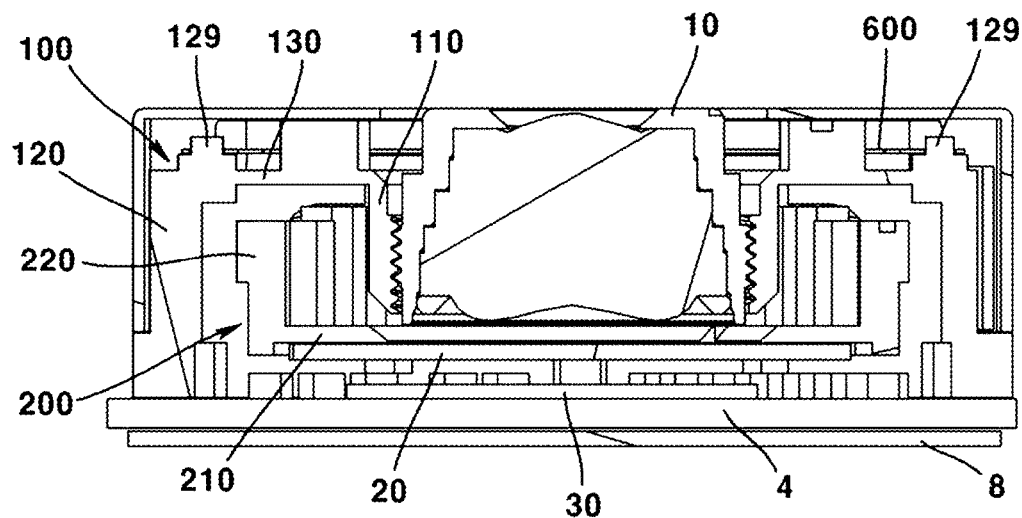
[FIG.4b]
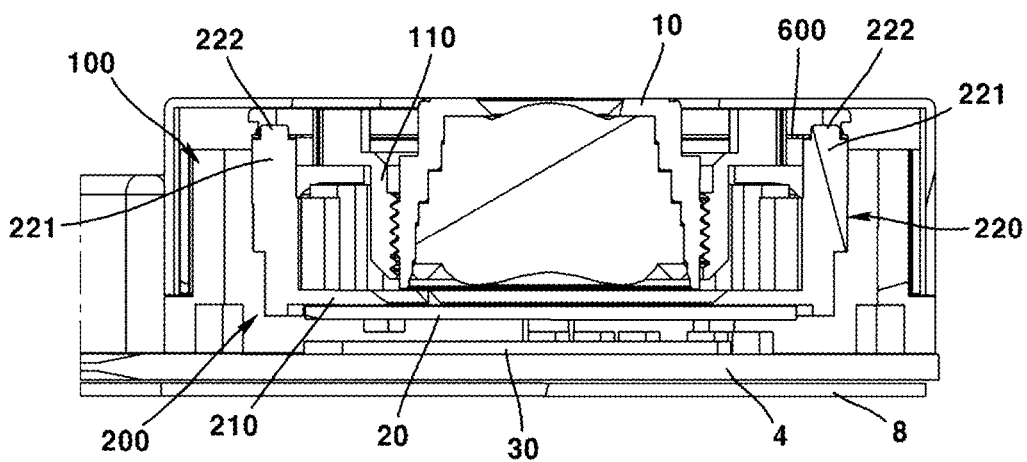

[FIG.5]
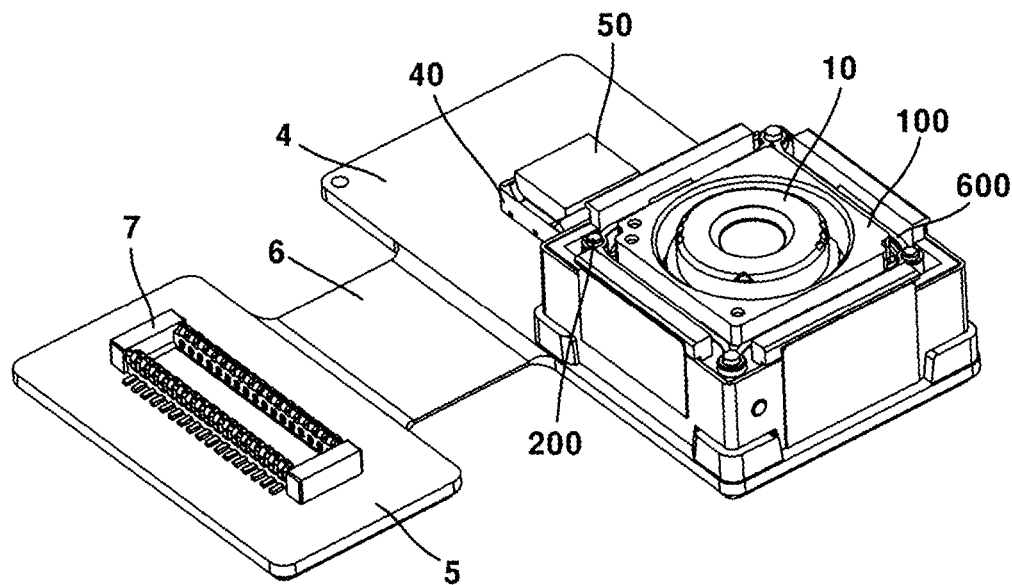
[FIG.6]
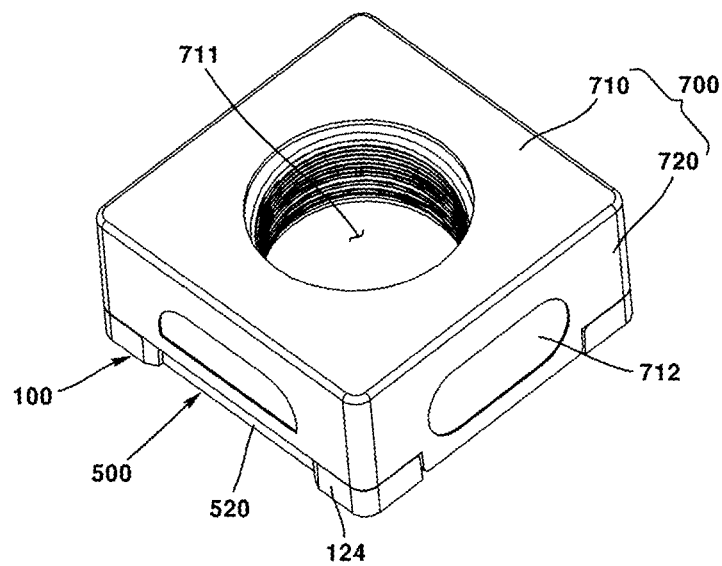

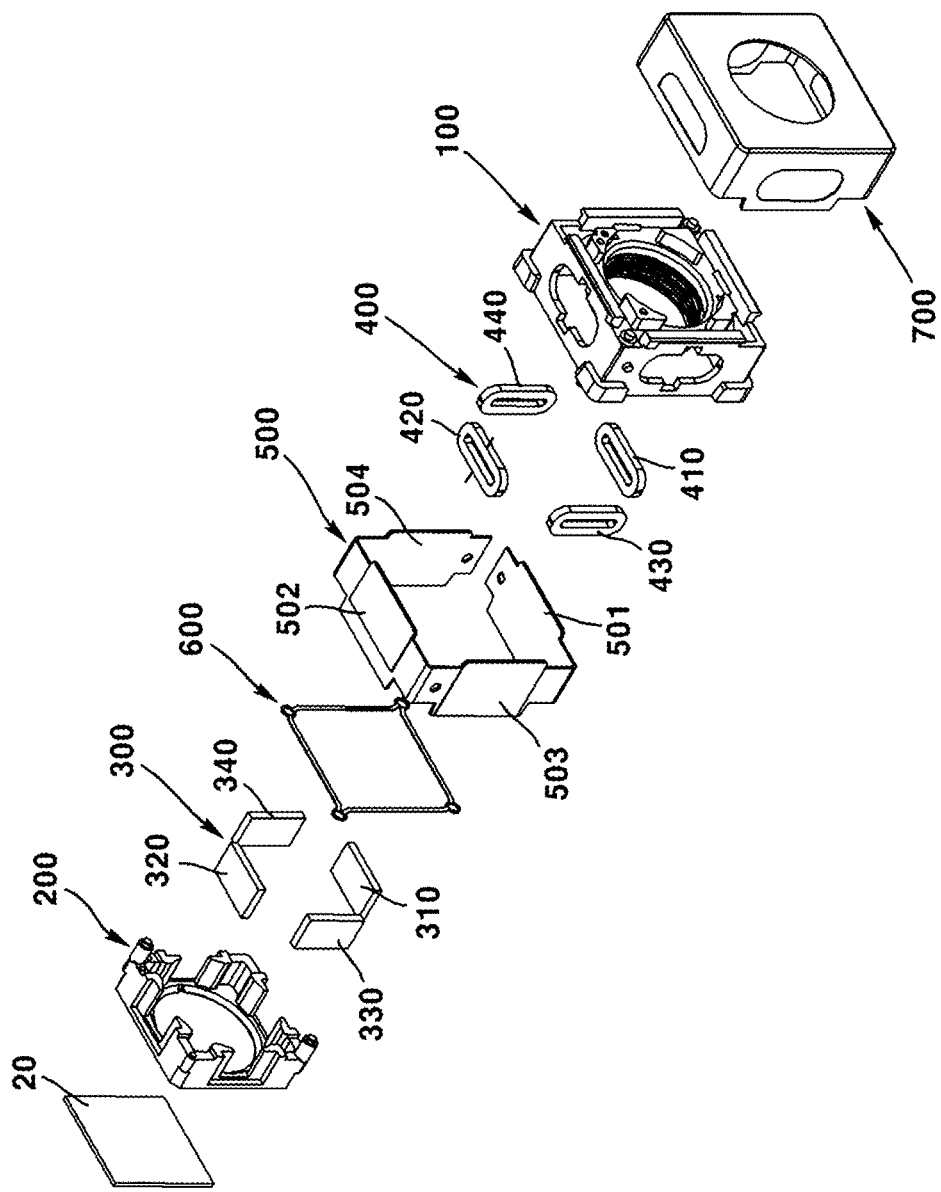

[FIG.8]
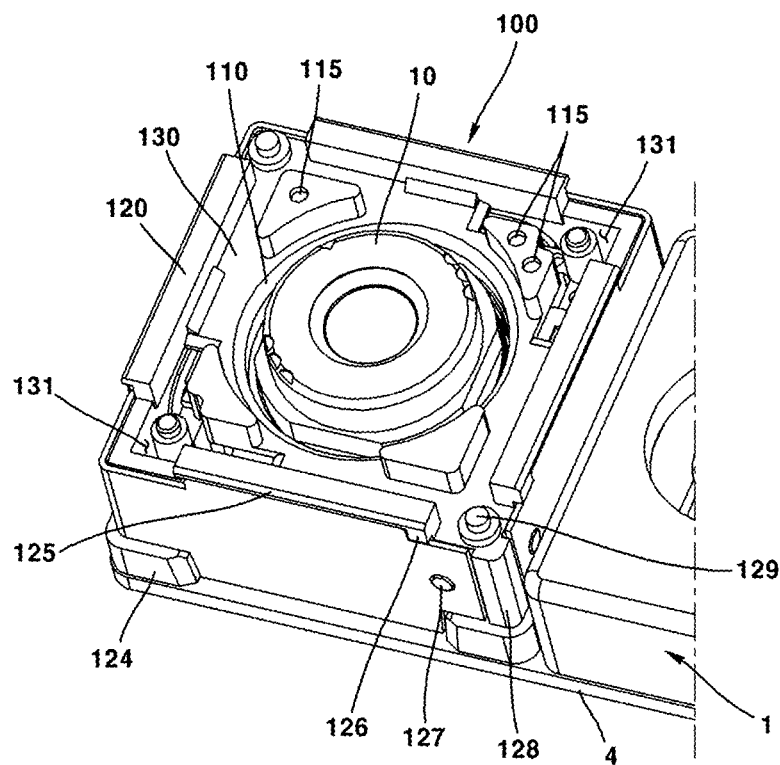
[FIG.9]
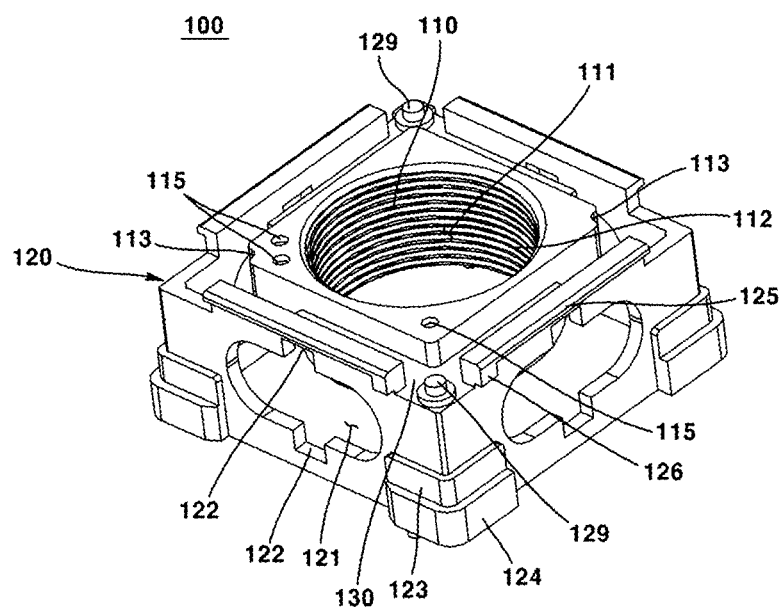

[FIG.10]
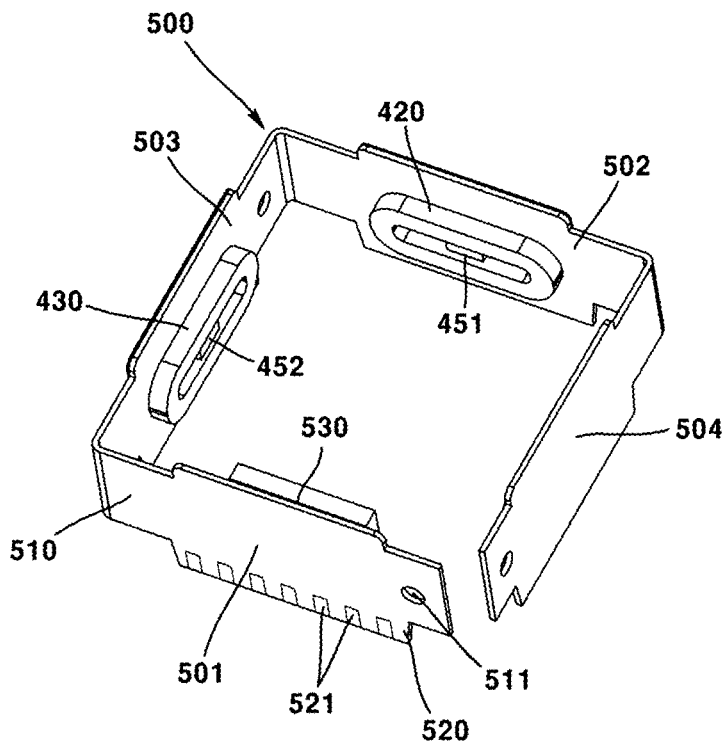
[FIG.11]
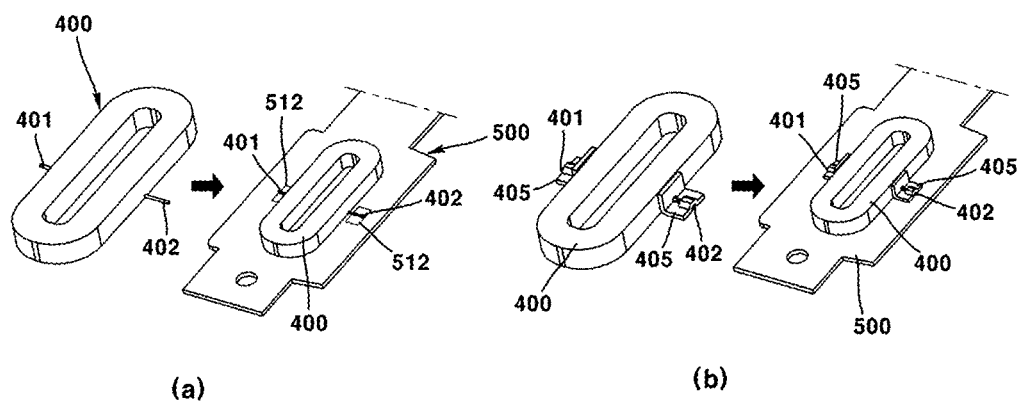
(a)　　　　　　　　　　　(b)

[FIG.12]
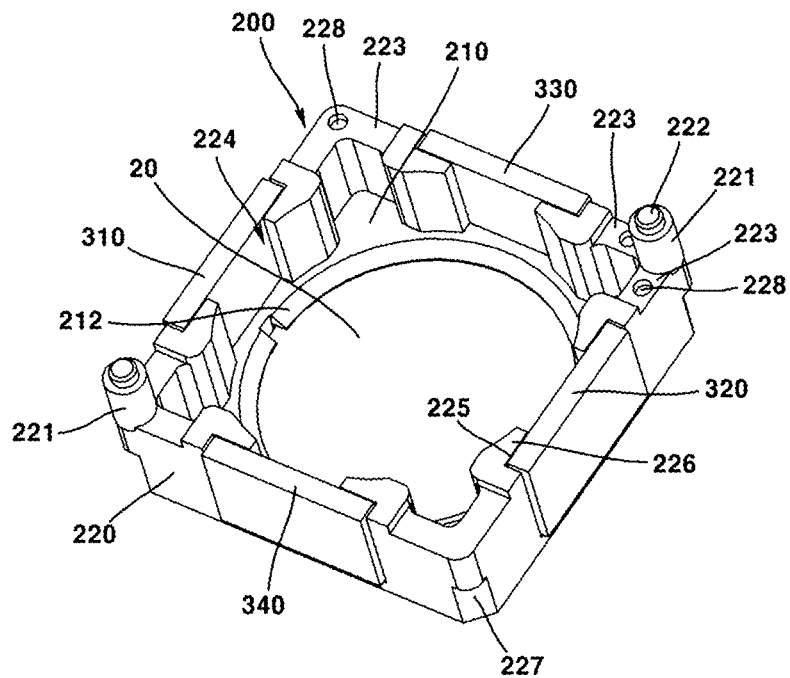
[FIG.13]
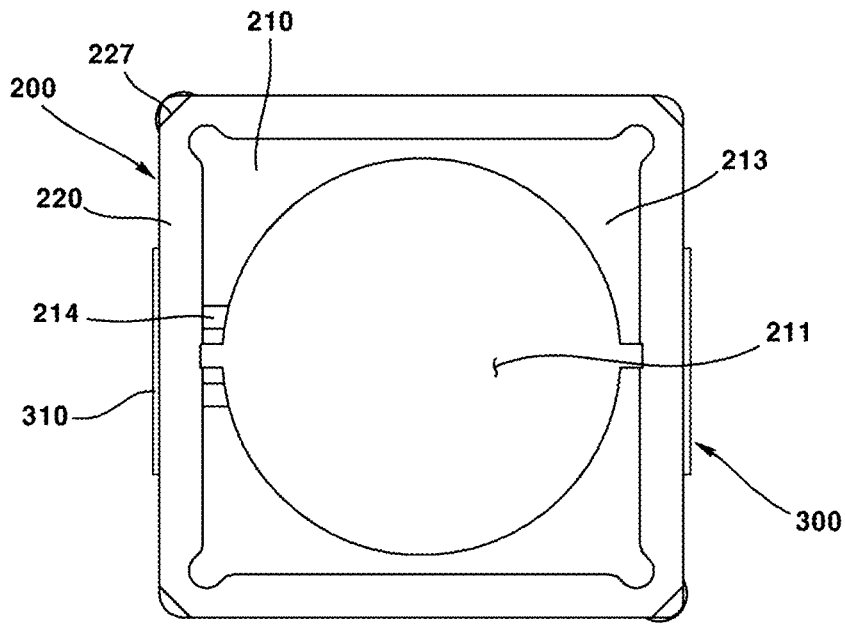

[FIG.14]
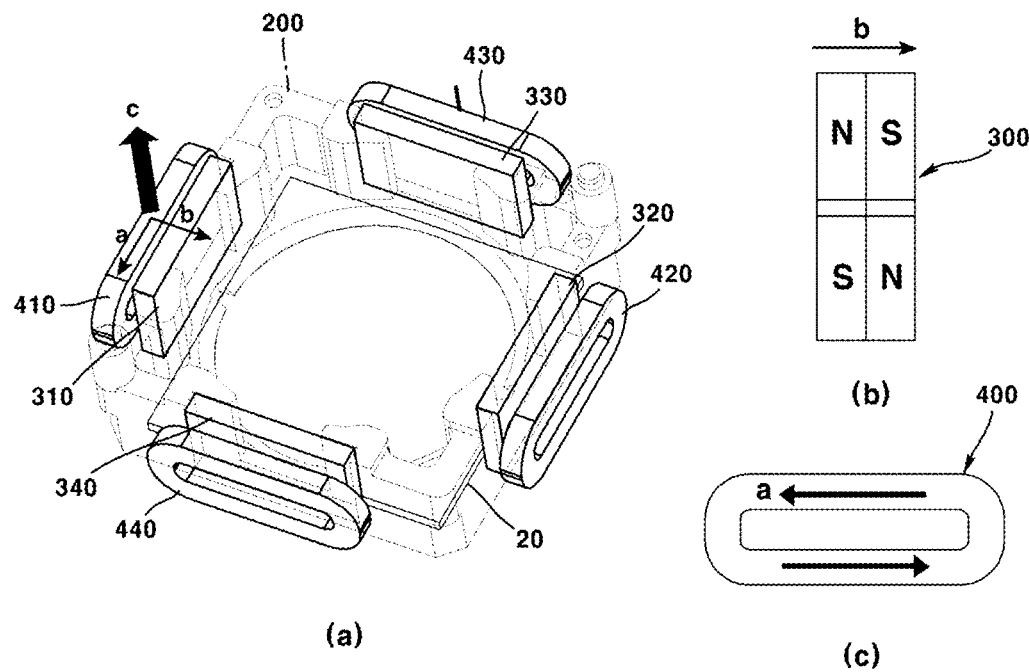

[FIG.15]
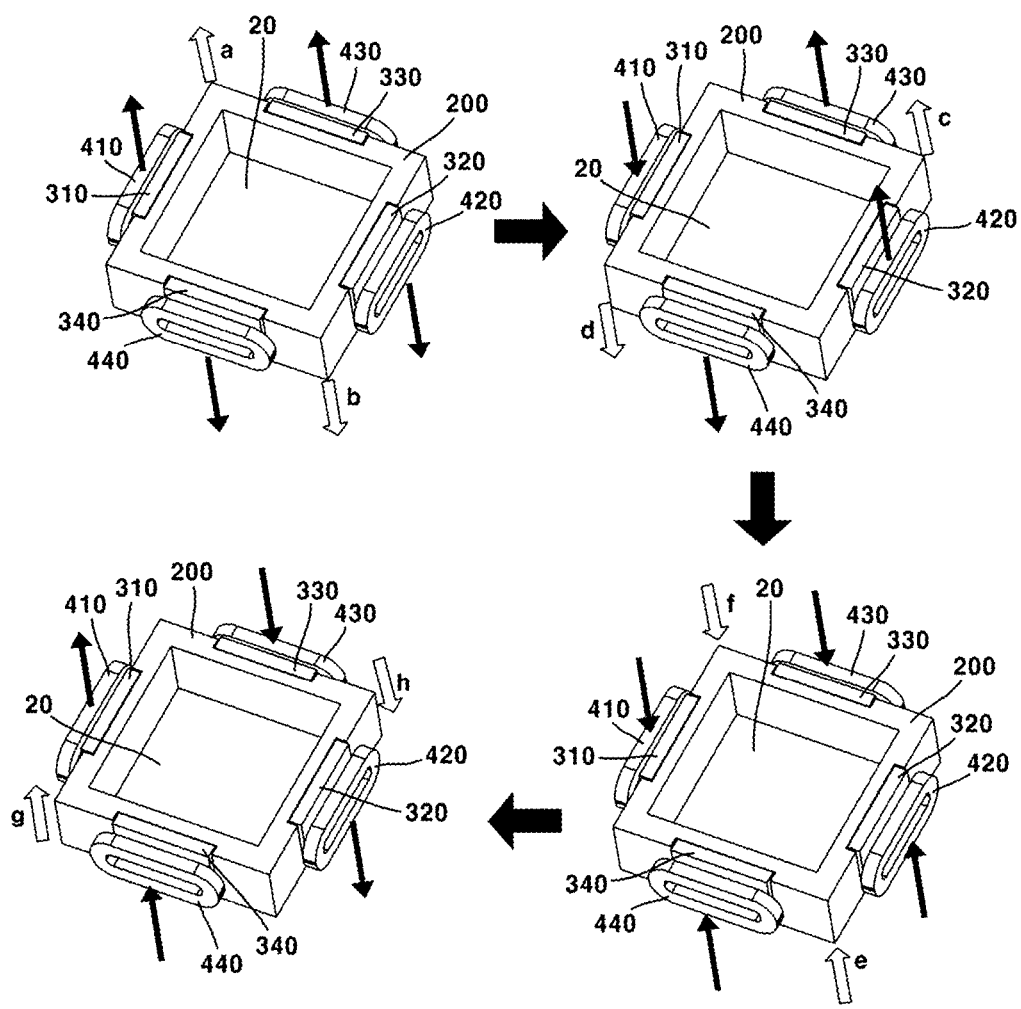

[FIG.16]
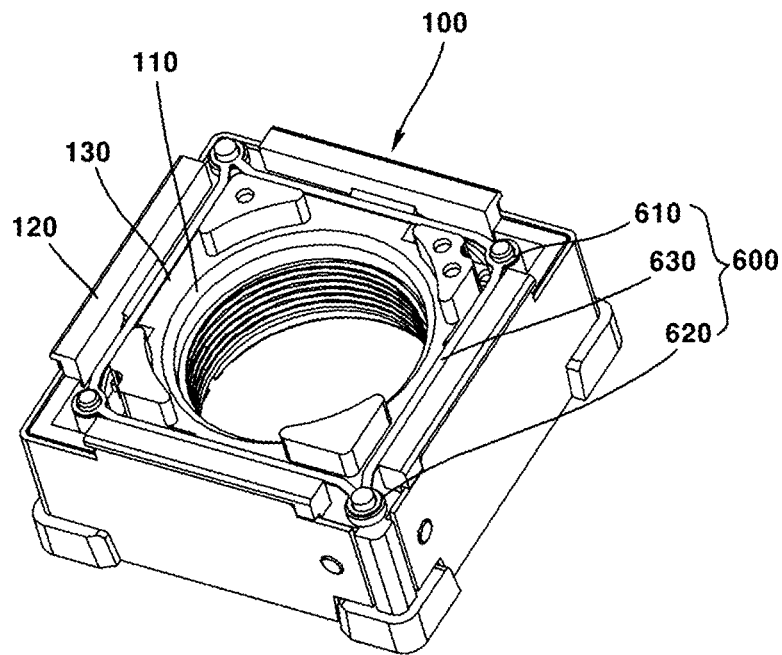
[FIG.17]
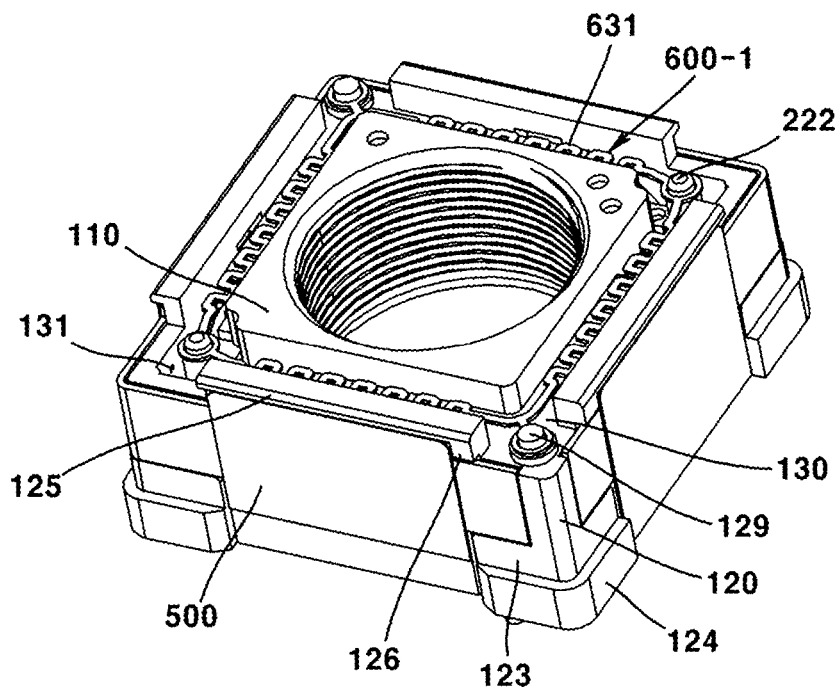

[FIG.18]
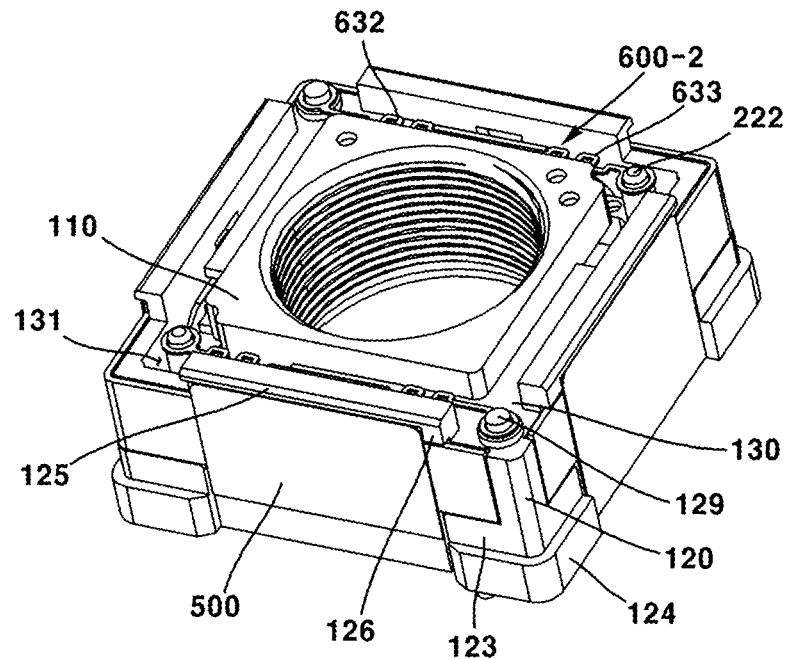
[FIG.19]
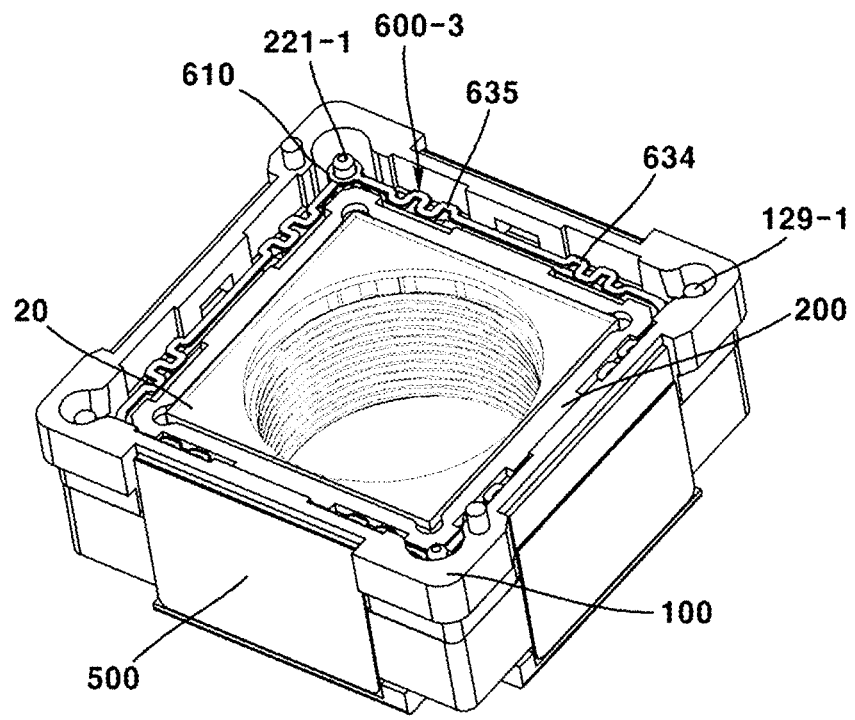

[FIG.20]
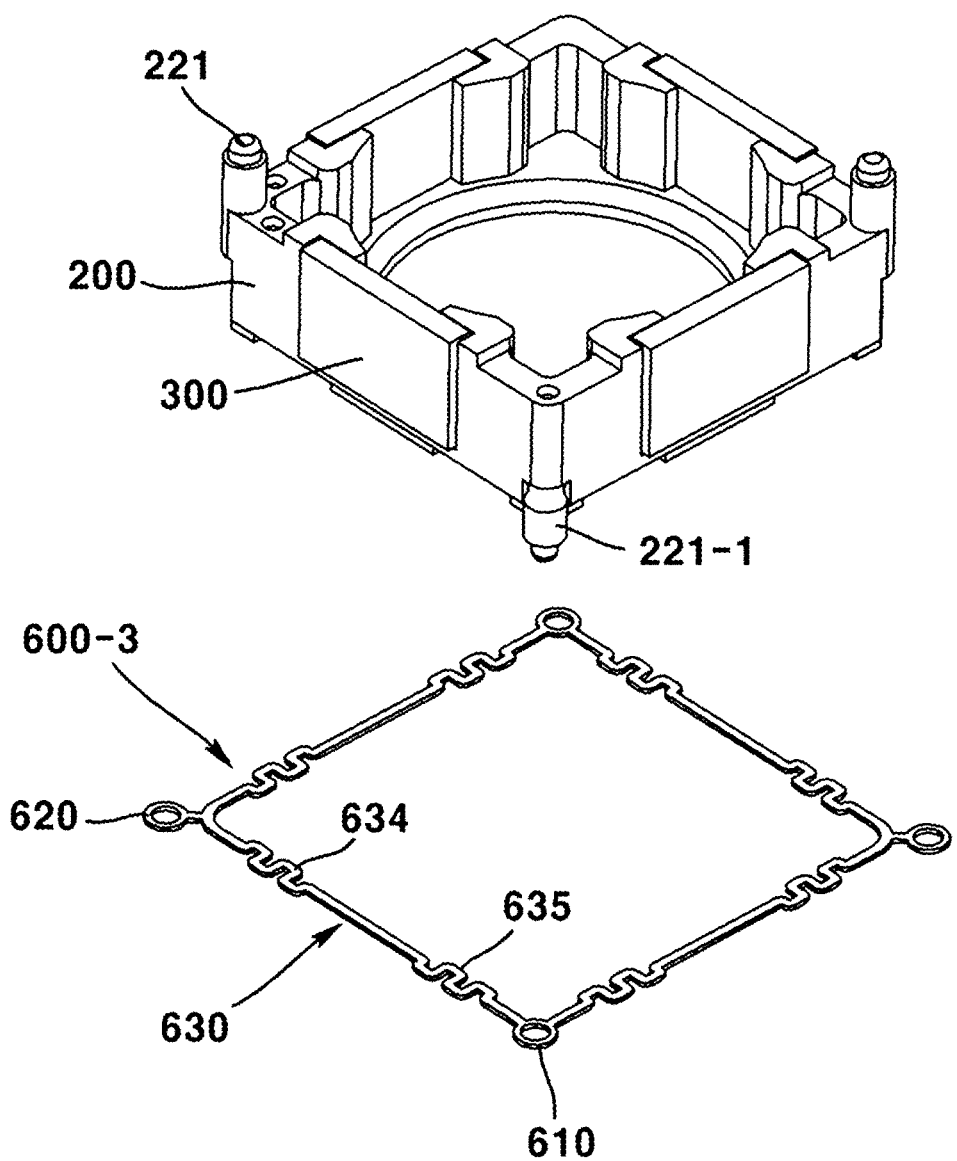

[FIG.21]
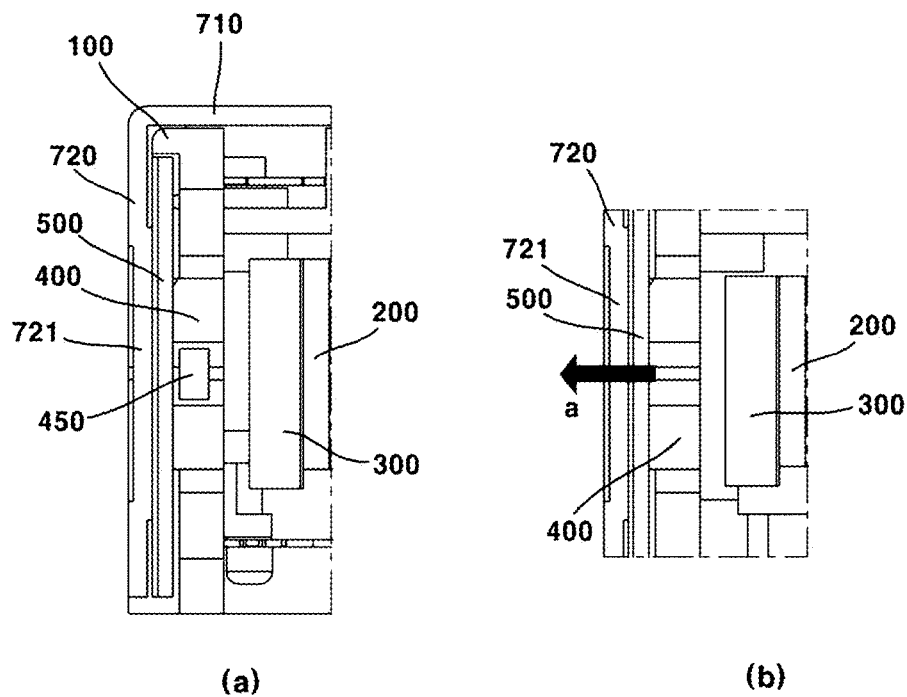
[FIG.22]
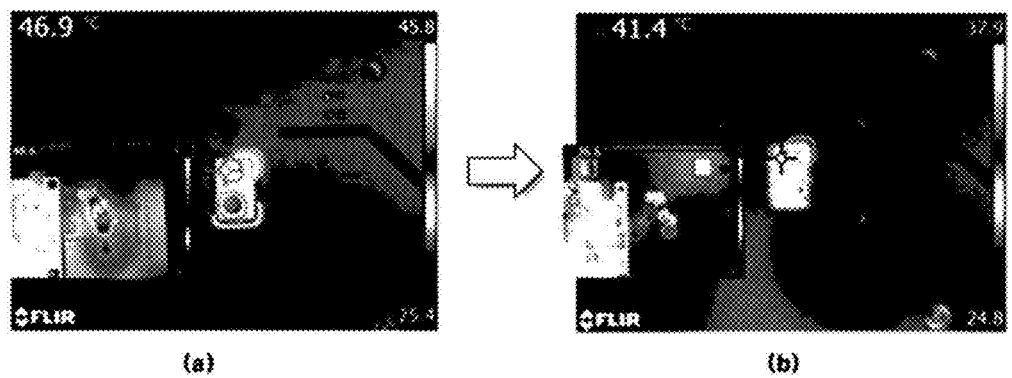

[FIG.23]
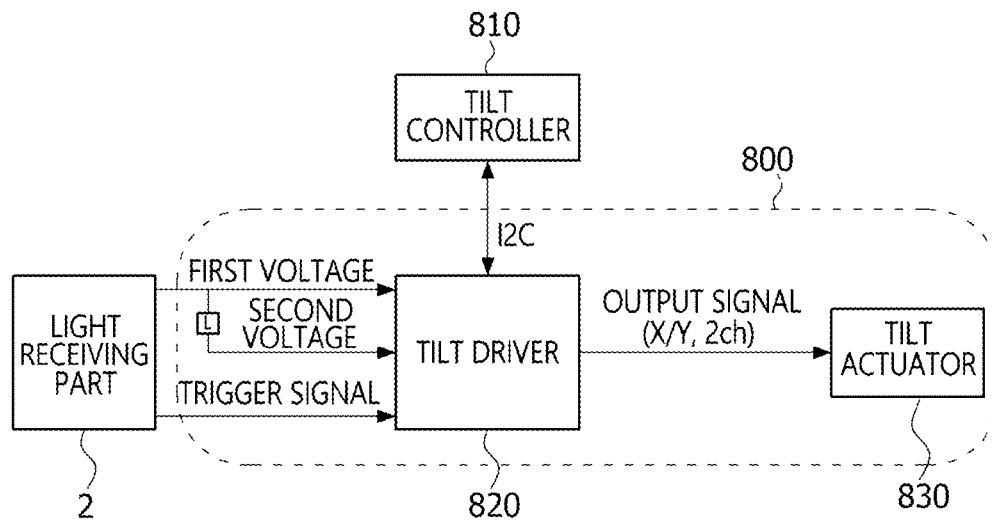
(a)
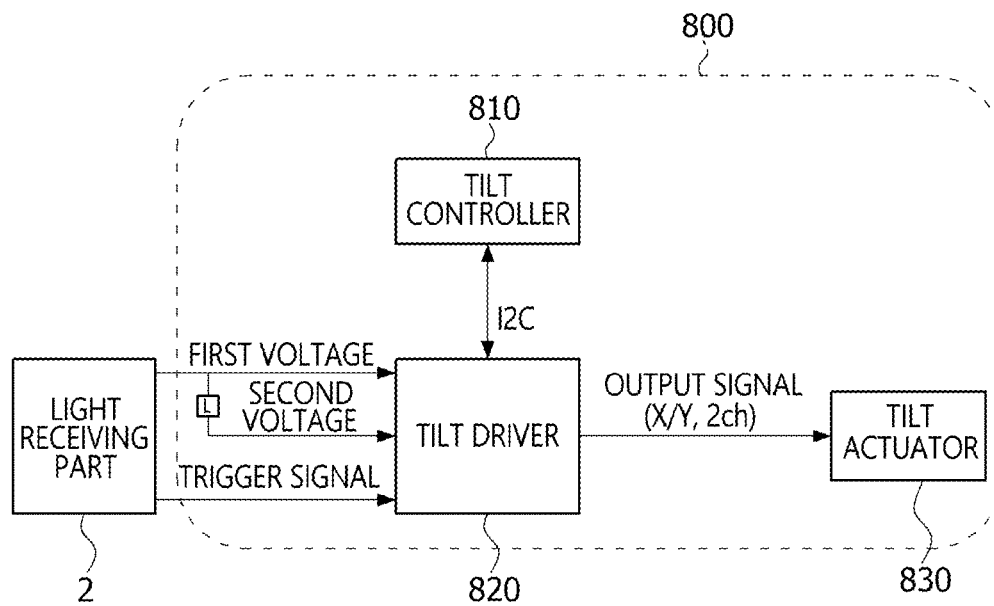
(b)

[FIG.24]
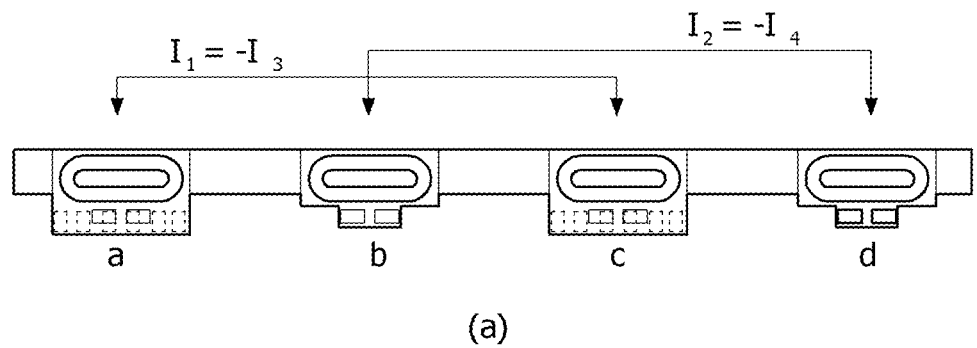
(a)
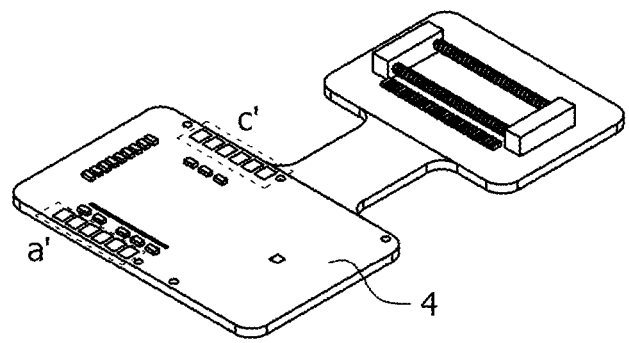
(b)
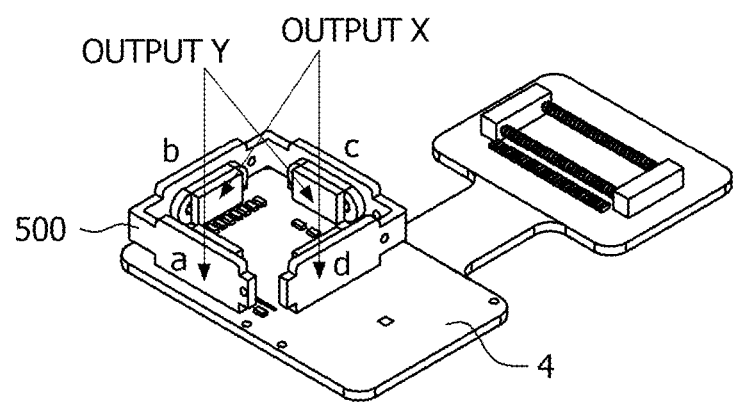
(c)

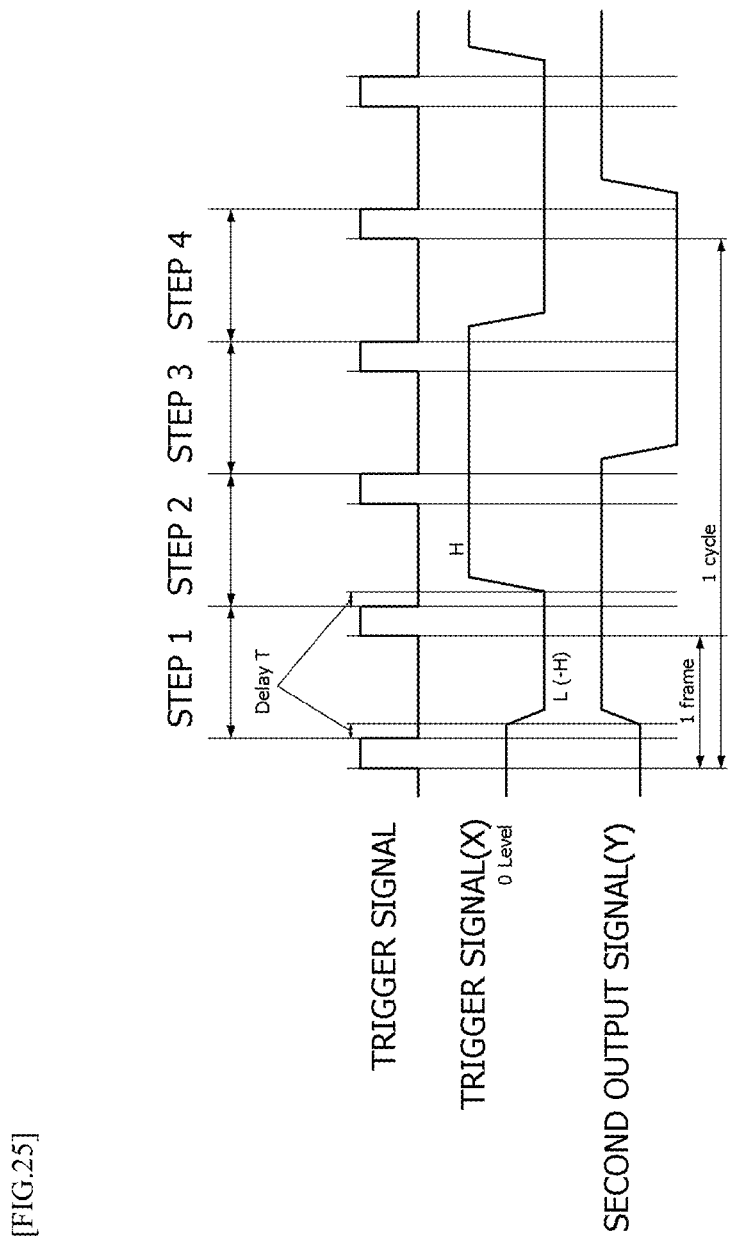

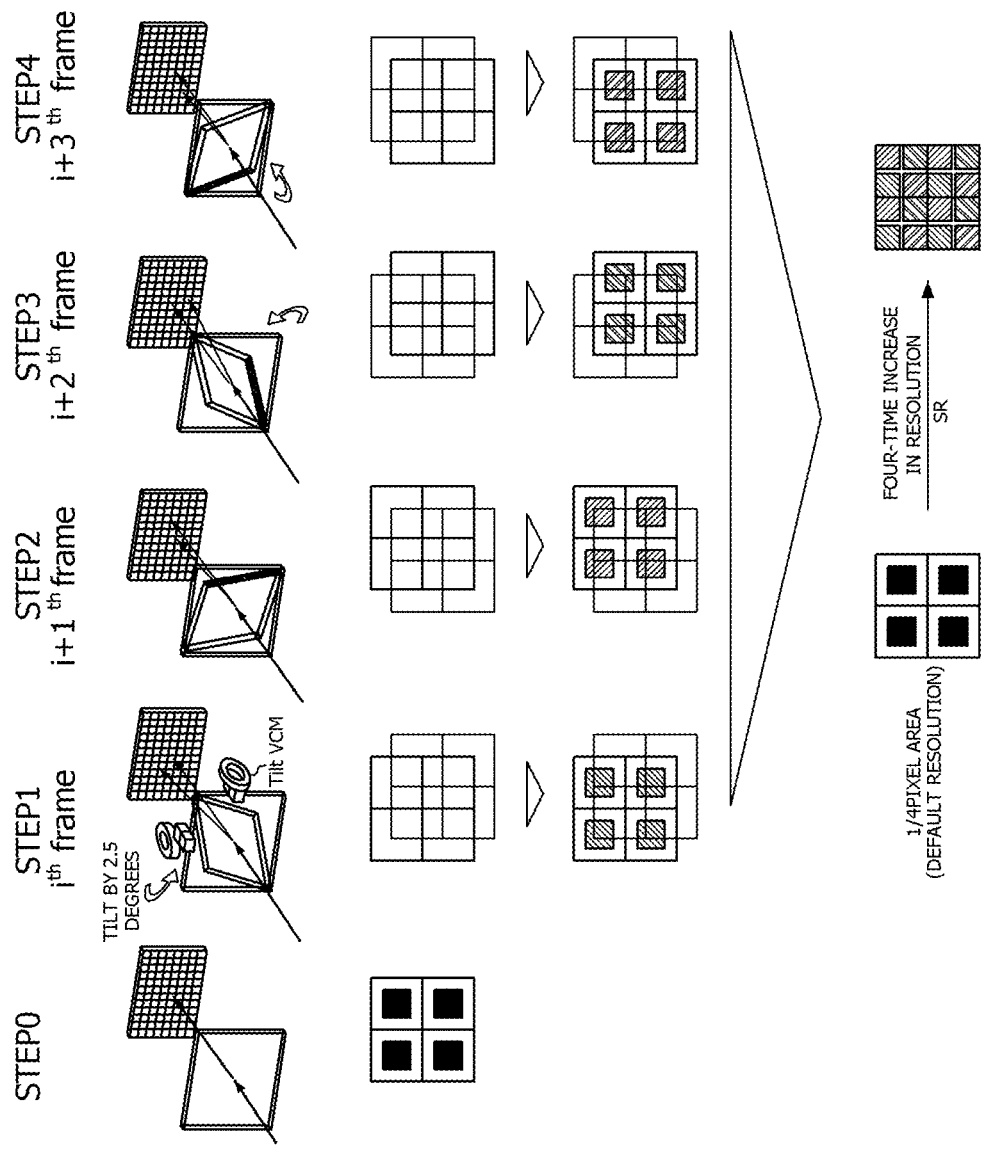

[FIG.27]
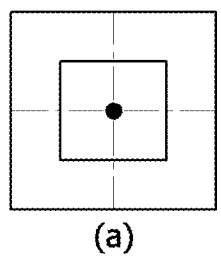
(a)
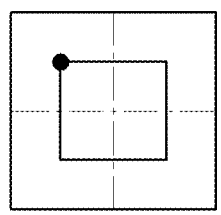  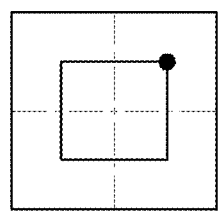
(b) (c)
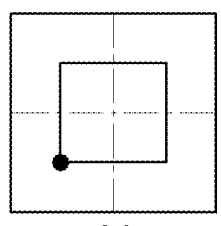  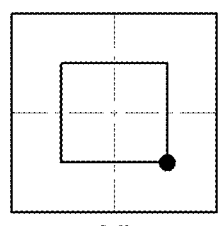
(e) (d)

[FIG.28]
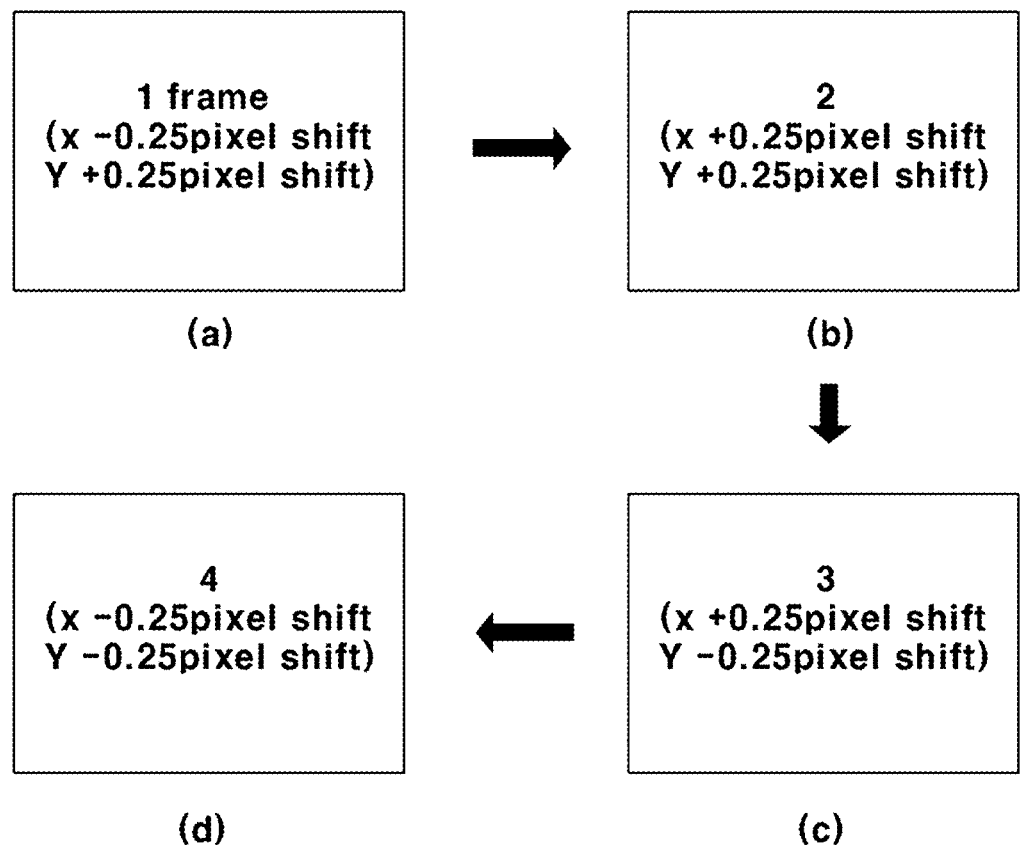

[FIG.29]
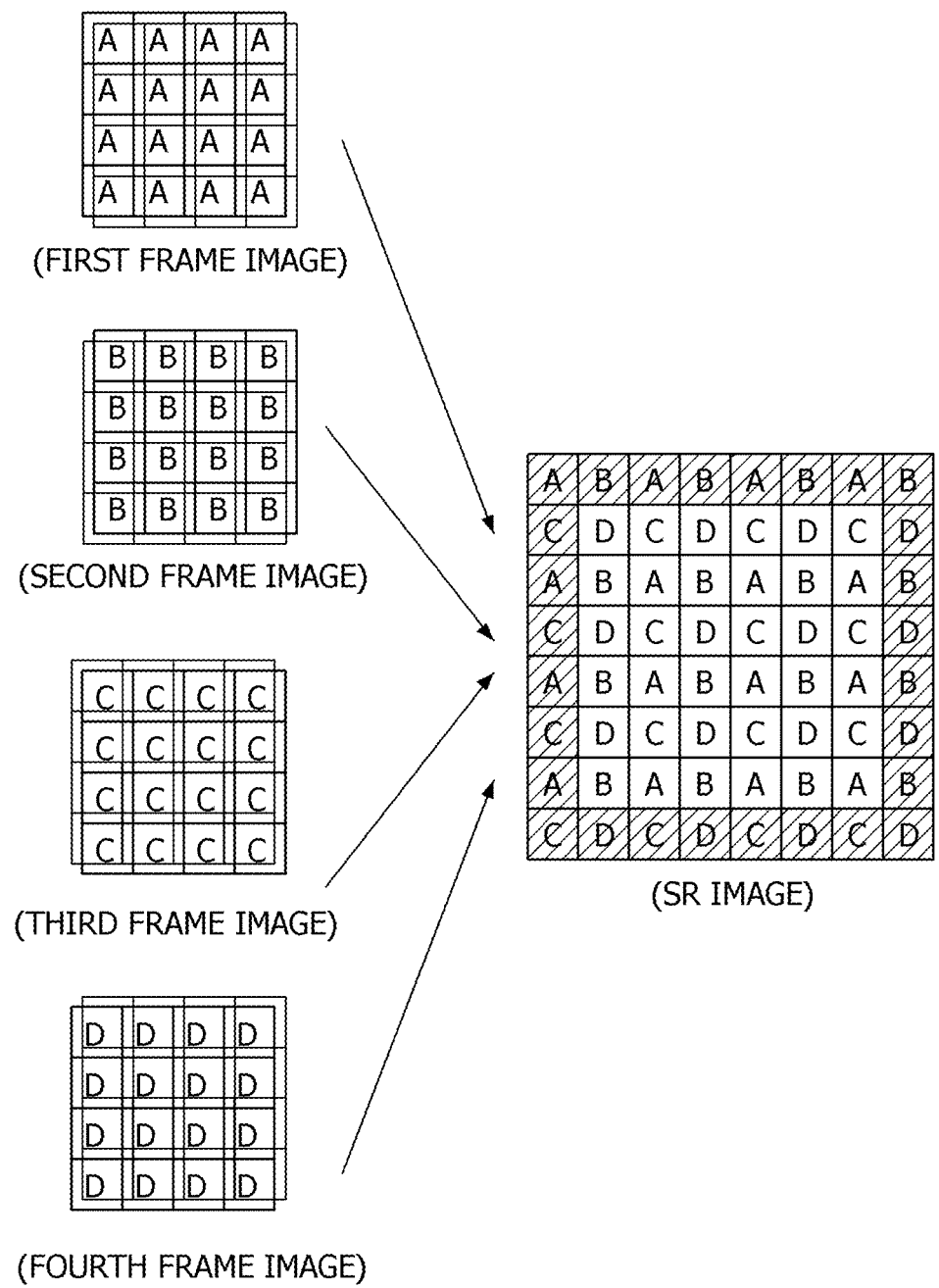

CAMERA MODULE HAVING A TILTABLE FILTER

CROSS REFERENCE TO RELATED APPLICATIONS

This application is the National Phase of PCT International Application No. PCT/KR2020/000169, filed on Jan. 6, 2020, which claims priority under 35 U.S.C. 119(a) to Patent Application No. 10-2019-0001890, filed in the Republic of Korea on Jan. 7, 2019, all of which are hereby expressly incorporated by reference into the present application.

TECHNICAL FIELD

The present embodiment relates to a camera module.

BACKGROUND ART

Three-dimensional content is applied not only to games and culture but also to many fields such as education, manufacturing, and autonomous driving. In order to acquire three-dimensional content, depth information (a depth map) is required. The depth information is information indicating a distance in space and represents perspective information of one point with respect to another point of a two-dimensional image.

Recently, Time of Flight (ToF) has attracted attention as a method of acquiring depth information. According to a TOF method, the distance to an object is calculated by measuring a flight time, that is, a time for light to be shot, reflected, and return. The greatest advantage of the ToF method is that it quickly provides distance information regarding three-dimensional space in real time. Also, a user can obtain accurate distance information without separate algorithm application or hardware correction. Also, a user can acquire accurate depth information even if he or she measures a very close subject or a moving subject.

However, the current ToF method has a problem in that information obtainable per frame, that is, resolution, is low.

The number of pixels of a sensor may be increased in order to increase the resolution, but in this case, the volume and manufacturing cost of a camera module are greatly increased.

DISCLOSURE

Technical Problem

The present embodiment is intended to provide a camera module that can be used in a ToF scheme to increase resolution.

In detail, the present embodiment is intended to provide a camera module capable of performing a super resolution (SR) technique.

Technical Solution

According to an aspect of the present invention, there is provided a camera module including a light emitting part configured to output a light signal to an object, a filter configured to allow the light signal to pass therethrough, at least one lens disposed on the filter and configured to collect the light signal from the object, a sensor configured to generate an electric signal from the light signal collected by the lens, the sensor including a plurality of pixels disposed in an array form, and a tilting part configured to tilt the filter to repeatedly move an optical path of the light signal having passed through the filter according to a predetermined rule, wherein the optical path of the light signal passing through the filter is moved in one direction among diagonal directions of the sensor with respect to an optical path corresponding to the filter being disposed parallel to the sensor.

The predetermined rule may include first to fourth tilt sequences in which the optical path of the light signal having passed through the filter is moved in different diagonal directions.

The tilting part may tilt the filter to move the optical path of the light signal having passed through the filter toward an upper left portion of the sensor with respect to an optical path corresponding to the filter being disposed parallel to the sensor according to the first tilt sequence.

The tilting part may tilt the filter to move the optical path of the input light signal having passed through the filter toward an upper right portion of the sensor with respect to an optical path corresponding to the filter being disposed parallel to the sensor according to the second tilt sequence.

The tilting part may tilt the filter to move the optical path of the input light signal having passed through the filter toward a lower right portion of the sensor with respect to an optical path corresponding to the filter being disposed parallel to the sensor according to the third tilt sequence.

The tilting part may tilt the filter to move the optical path of the input light signal having passed through the filter toward a lower left portion of the sensor with respect to an optical path corresponding to the filter being disposed parallel to the sensor according to the fourth tilt sequence.

The tilting part may tilt the filter according to the first tilt sequence such that a line segment formed by a center point and an upper left vertex of the filter forms a positive tilting angle with respect to a reference surface, which is a surface of the filter before the tilting, and a line segment formed by the center point and a lower right vertex of the filter forms a negative tilting angle with respect to the reference surface.

The tilting part may tilt the filter according to the second tilt sequence such that a line segment formed by a center point and an upper right vertex of the filter forms a positive tilting angle with respect to a reference surface, which is a surface of the filter before the tilting, and a line segment formed by the center point and a lower left vertex of the filter forms a negative tilting angle with respect to the reference surface.

The tilting part may tilt the filter according to the third tilt sequence such that a line segment formed by a center point and a lower right vertex of the filter forms a positive tilting angle with respect to a reference surface, which is a surface of the filter before the tilting, and a line segment formed by the center point and an upper left vertex of the filter forms a negative tilting angle with respect to the reference surface.

The tilting part may tilt the filter according to the fourth tilt sequence such that a line segment formed by a center point and a lower left vertex of the filter forms a positive tilting angle with respect to a reference surface, which is a surface of the filter before the tilting, and a line segment formed by the center point and an upper right vertex of the filter forms a negative tilting angle with respect to the reference surface.

The optical path of the light signal may be moved in units greater than 0 pixels and less than 1 pixel of the sensor with respect to a predetermined optical reference path.

The tilting part may tilt the filter by repeating any one combination in which the first to fourth tilt sequences are sequentially arranged.

The camera module may further include an image synthesizing part configured to combine images corresponding to the first to fourth tilt sequences to generate a high-resolution image.

Advantageous Effects

According to the present embodiment, it is possible to acquire depth information with high resolution without significantly increasing the number of pixels of a sensor.

Also, it is possible to acquire a high-resolution image through the SR technique from a plurality of low-resolution images obtained through the camera module according to the present embodiment.

DESCRIPTION OF DRAWINGS

FIG. 1 is a perspective view of a camera module according to the present embodiment;

FIG. 2 is an exploded perspective view of the camera module according to the present embodiment;

FIG. 3A is a sectional view of the camera module according to the present embodiment taken along line A-A of FIG. 1;

FIG. 3B is a sectional view of the camera module according to the present embodiment taken along line B-B of FIG. 1;

FIG. 4A is a sectional view of the camera module according to the present embodiment taken along line C-C of FIG. 1;

FIG. 4B is a sectional view of the camera module according to the present embodiment taken along line D-D of FIG. 1;

FIG. 5 is a perspective view of a partial configuration of the camera module according to the present embodiment;

FIG. 6 is a perspective view of a partial configuration of a light receiving part of the camera module according to the present embodiment;

FIG. 7 is an exploded perspective view of a partial configuration of the light receiving part of FIG. 6;

FIG. 8 is a perspective view of a partial configuration of the camera module according to the present embodiment;

FIG. 9 is a perspective view of a housing of the camera module according to the present embodiment;

FIG. 10 is a perspective view of a substrate and a coil of the camera module according to the present embodiment;

FIG. 11A is a diagram showing the coupling between the coil and the substrate of the camera module according to the present embodiment, and FIG. 11B is a diagram showing the coupling between the coil and the substrate of the camera module according to a variant;

FIG. 12 is a perspective view of a holder and a magnet of the camera module according to the present embodiment;

FIG. 13 is a bottom view of the holder and the magnet of FIG. 12;

FIG. 14 is a diagram illustrating the Lorentz force between a magnet and a coil in the present embodiment;

FIG. 15 is a diagram illustrating diagonal tilting control of a filter in the present embodiment;

FIG. 16 is a perspective view of a part of the camera module including an elastic member according to the present embodiment;

FIG. 17 is a perspective view of a part of the camera module including an elastic member according to a variant;

FIG. 18 is a perspective view of a part of the camera module including an elastic member according to another variant;

FIG. 19 is a bottom perspective view of a part of the camera module including an elastic member according to still another variant;

FIG. 20 is an exploded perspective view showing a partial configuration of the part of the camera module shown in FIG. 19;

FIG. 21A is a sectional view showing a coupling structure for a cover, the substrate, and the coil of the camera module according to present embodiment, and FIG. 21B is a partially enlarged diagram of FIG. 21A showing a heat dissipation flow according to conduction;

FIG. 22A represents temperature measurement data of the camera module according to a comparative example, and FIG. 22B is temperature measurement data of the camera module according to the present embodiment;

FIG. 23 is a diagram illustrating a tilt part according to the present embodiment;

FIG. 24 is a diagram illustrating a tilt actuator in detail;

FIG. 25 is a diagram illustrating a driving sequence of the tilt part;

FIG. 26 shows a light path movement process according to an embodiment of the present invention;

FIG. 27 is a conceptual diagram conceptually sequentially illustrating a plurality of images acquired for a super resolution (SR) technique in the camera module according to the present embodiment;

FIG. 28 is a diagram sequentially showing images of first to fourth frames acquired for the SR technique in the camera module according to the present embodiment; and FIG. 29 is a diagram illustrating an SR image.

MODES OF THE INVENTION

Hereinafter, preferred embodiments of the present invention will be described in detail with reference to the accompanying drawings. Hereinafter, preferred embodiments of the present invention will be described in detail with reference to the accompanying drawings.

However, the technical spirit of the present invention is not limited to some embodiments described herein, but may be implemented in various forms. Within the technical spirit of the present invention, one or more components may be optionally combined or substituted in the embodiments.

Also, unless expressly defined otherwise, terms (including technical and scientific terms) used herein may be interpreted as having the same meaning as commonly understood by one of ordinary skill in the art to which the present invention belongs. Generally used terms such as terms defined in dictionaries may be interpreted in consideration of the contextual meaning of the related art.

In addition, terms used herein are for explaining the embodiments rather than limiting the present invention.

In this specification, the singular forms "a," "an" and "the" are intended to include the plural forms as well, unless the context clearly indicates otherwise. The expression "at least one (or one or more) of A, B, and C" may include one or more of all possible combinations of A, B, and C.

In addition, terms such as first, second, A, B, (a), (b) or the like may be used herein when describing elements of the embodiments of the present invention. These terms are merely used to distinguish one element from another, and the property, order, sequence and the like of a corresponding element are not limited by these terms.

When one element is referred to as being "connected," "coupled," or "joined" to another element, the one element may be directly "connected," "coupled," or "joined" to the other element directly or through still another element therebetween.

Also, when an element is referred to as being above (over) or below (under) another element, the one element may be in direct contact with the other element, or one or more other elements may be formed or disposed between the two elements. Also, the term above (over) or below (under) used herein may represent a downward direction in addition to an upward direction with respect to one element.

An optical device according to the present embodiment will be described below.

The optical device may include any one of a cell phone, a mobile phone, a smartphone, a portable smart device, a digital camera, a laptop computer, a digital broadcasting terminal, a personal digital assistant (PDA), a portable multimedia player (PMP), and a navigation device. However, the type of the optical device is not limited thereto, and any device for capturing an image or a picture may be included in the optical device.

The optical device may include a main body. The main body may be formed as a bar. Alternatively, the main body may have various structures in which two or more sub-bodies are movable relative to each other, such as a slide type, a folder type, a swing type, and a swivel type. The main body may include a case (casing, housing, and cover) forming an exterior thereof. For example, the main body may include a front case and a rear case. Various electronic components of the optical device may be built in a space formed between the front case and the rear case.

The optical device may include a display. The display may be disposed on one surface of the main body of the optical device. The display may output an image. The display may output an image captured by a camera.

The optical device may include a camera. The camera may include a Time of Flight (ToF) camera apparatus. The ToF camera apparatus may be disposed on the front surface of the main body of the optical device. In this case, the ToF camera apparatus may be used for various types of biometrics of a user, such as face recognition and iris recognition, for security authentication of the optical device.

The configuration of the ToF camera apparatus according to the present embodiment will be described below with reference to the drawings.

FIG. 1 is a perspective view of the camera module according to the present embodiment; FIG. 2 is an exploded perspective view of the camera module according to the present embodiment; FIG. 3A is a sectional view of the camera module according to the present embodiment taken along line A-A of FIG. 1; FIG. 3B is a sectional view of the camera module according to the present embodiment taken along line B-B of FIG. 1; FIG. 4A is a sectional view of the camera module according to the present embodiment taken along line C-C of FIG. 1; FIG. 4B is a sectional view of the camera module according to the present embodiment taken along line D-D of FIG. 1; FIG. 5 is a perspective view of a partial configuration of the camera module according to the present embodiment; FIG. 6 is a perspective view of a partial configuration of a light receiving part of the camera module according to the present embodiment; FIG. 7 is an exploded perspective view of a partial configuration of the light receiving part of FIG. 6; FIG. 8 is a perspective view of a partial configuration of the camera module according to the present embodiment; FIG. 9 is a perspective view of a housing of the camera module according to the present embodiment; FIG. 10 is a perspective view of a substrate and a coil of the camera module according to the present embodiment; FIG. 11A is a diagram showing the coupling between the coil and the substrate of the camera module according to the present embodiment; FIG. 11B is a diagram showing the coupling between the coil and the substrate of the camera module according to a variant; FIG. 12 is a perspective view of a holder and a magnet of the camera module according to the present embodiment; FIG. 13 is a bottom view of the holder and the magnet of FIG. 12; FIG. 14 is a diagram illustrating the Lorentz force between a magnet and a coil in the present embodiment; FIG. 15 is a diagram illustrating diagonal tilting control of a filter in the present embodiment; FIG. 16 is a perspective view of a part of the camera module including an elastic member according to the present embodiment; FIG. 17 is a perspective view of a part of the camera module including an elastic member according to a variant; FIG. 18 is a perspective view of a part of the camera module including an elastic member according to another variant; FIG. 19 is a bottom perspective view of a part of the camera module including an elastic member according to still another variant; FIG. 20 is an exploded perspective view showing a partial configuration of the part of the camera module shown in FIG. 19; FIG. 21A is a sectional view showing a coupling structure for a cover, the substrate, and the coil of the camera module according to present embodiment; FIG. 21B is a partially enlarged diagram of FIG. 21A showing a heat dissipation flow according to conduction; FIG. 22A represents temperature measurement data of the camera module according to a comparative example; and FIG. 22B is temperature measurement data of the camera module according to the present embodiment.

The ToF camera apparatus may include a camera apparatus. The ToF camera apparatus may include a camera module.

The camera module may include a light emitting part 1. The light emitting part 1 may be a light emitting module, a light emitting unit, a light emitting assembly, or a light emitting apparatus. The light emitting part 1 may generate an output light signal and then emit the signal to an object. In this case, the light emitting part 1 may generate and output an output light signal in the form of a pulse wave or a continuous wave. The continuous wave may be a sinusoid wave or a squared wave. By generating the output light signal in the form of a pulse wave or a continuous wave, the ToF camera apparatus may detect a phase difference between an output light signal that is output from the light emitting part 1 and an input light signal that is reflected from the object and then input to the light receiving part 2 of the ToF camera apparatus. In the present specification, output light refers to light that is output from the light emitting part 1 and incident on the object, and input light refers to light that is output from the light emitting part 1, reflected from the object, and then input to the ToF camera apparatus. From the position of the object, the output light may be incident light, and the input light may be reflected light.

The light emitting part 1 emits the generated output light signal to the object during a predetermined exposure period (integration time). Here, the exposure period refers to one frame period. When a plurality of frames are generated, the predetermined exposure period is repeated. For example, when the ToF camera apparatus captures the object at 20 fps, the exposure period is ¹⁄₂₀ sec. Also, when 100 frames are generated, the exposure period may be repeated 100 times.

The light emitting part 1 may generate a plurality of output light signals having different frequencies. The light emitting part 1 may sequentially and repeatedly generate a plurality of output light signals having different frequencies.

Alternatively, the light emitting part 1 may generate a plurality of output light signals having different frequencies at the same time.

The light emitting part 1 may include a light source 40. The light source 40 may generate light. The light source 40 may output light. The light source 40 may emit light. The light generated by the light source 40 may be infrared light having a wavelength of 770 nm to 3000 nm. Alternatively, the light generated by the light source 40 may be visible light having a wavelength of 380 nm to 770 nm. The light source 40 may include a light emitting diode (LED). The light source 40 may include a plurality of LEDs arranged in a certain pattern. In addition, the light source 40 may include an organic light emitting diode (OLED) or a laser diode (LD).

The light emitting part 1 may include a light modulating part configured to modulate light. The light source 40 may repeatedly blink (on/off) at predetermined time intervals to generate an output light signal in the form of a pulse wave or a continuous wave. A predetermined time interval may be the frequency of the output light signal. The blinking of the light source 40 may be controlled by the light modulating part. The light modulating part may control the blinking of the light source 40 to control the light source 40 to generate an output light signal in the form of a continuous wave or a pulse wave. The light modulating part may control the light source to generate an output light signal in the form of a continuous wave or a pulse wave through frequency modulation or pulse modulation.

The light emitting part 1 may include a diffuser 50. The diffuser 50 may be a diffuser lens. The diffuser 50 may be disposed in front of the light source 40. Light emitted from the light source 40 may be incident on the object through the diffuser 50. The diffuser 50 may change a path of the light emitted from the light source 40. The diffuser 50 may collect the light emitted from the light source 40.

The light emitting part 1 may include a cover 60. The cover 60 may be disposed to cover the light source 40. The cover 60 may be disposed on a printed circuit board 4. The cover 60 may include an upper plate including a hole and a side plate extending from the upper plate.

The camera module may include a light receiving part 2. The light receiving part 2 may be a light receiving module, a light receiving unit, a light receiving assembly, or a light receiving apparatus. The light receiving part 2 may sense light that is emitted from the light emitting part 1 and reflected from the object. The light receiving part 2 may generate an input light signal corresponding to the output light signal output from the light emitting part 1. The light receiving part 2 may be disposed in parallel to the light emitting part 1. The light receiving part 2 may be disposed beside the light emitting part 1. The light receiving part 2 may be disposed in the same direction as the light emitting part 1.

The light receiving part 2 may include a lens module 10. Light reflected from the object may pass through the lens module 10. The optical axis of the lens module 10 and the optical axis of a sensor 30 may be aligned. The lens module 10 may be coupled to a housing 100. The lens module 10 may be fastened to the housing 100.

The light receiving part 2 may include a filter 20. The filter 20 may be coupled to a holder 200. The filter 20 may be disposed between the lens module 10 and the sensor 30. The filter 20 may be disposed on an optical path between the object and the sensor 30. The filter 20 may filter light having a predetermined wavelength range. The filter 20 may allow light of a specific wavelength to pass therethrough. That is, the filter 20 may block light of wavelengths other than the specific wavelength by reflecting or absorbing the light. The filter 20 may pass infrared light and block light of wavelengths other than that of the infrared light. Alternatively, the filter 20 may pass visible light and block light of wavelengths other than that of the visible light. The filter 20 may be movable. The filter 20 may move together with the holder 200. The filter 20 may be capable of being tilted. The filter 20 may be moved to adjust an optical path. Through the movement, the filter 20 may change a path of the light incident on the sensor 30. The filter 20 may change a field-of-view (FOV) angle or direction of the incident light.

In the present embodiment, the filter 20 is tilted in an oblique direction to change a path of light coming in, thus allowing high resolution ToF. The filter 20 may be disposed to be tilted diagonally by applying a forward current to two adjacent coils among first to fourth coils 410, 420, 430, and 440 and applying a reverse current to the other two coils. The filter 20 may be tilted in the diagonal direction through the control of the current applied to the first coil 410 and the third coil 430. The filter 20 may be disposed to be tilted in the diagonal direction by applying a current to two adjacent coils among the first to fourth coils 410, 420, 430, and 440. The filter 20 may include a first edge disposed at a position corresponding to a first corner portion of the holder 200. In this case, the first edge of the filter 20 may be tilted upward along the optical axis by the first coil 410 and the third coil 430. The filter 20 may include a third edge disposed at a position corresponding to a third corner portion of the holder 200. In this case, the third edge of the filter 20 may be tilted downward along the optical axis by the second coil 420 and the fourth coil 440, and the first edge of the filter 20 may be further tilted upward along the optical axis by the second coil 420 and the fourth coil 440.

The light receiving part 2 may include a sensor 30. The sensor 30 may sense light. The sensor 30 may be an image sensor configured to sense light. The sensor 30 may sense and output light as an electrical signal. The sensor 30 may sense light of a wavelength corresponding to the wavelength of the light output from the light source 40. The sensor 30 may sense infrared light. Alternatively, the sensor 30 may sense visible light.

The sensor 30 may include a pixel array configured to receive light passing through the lens module 10 and convert the light into an electric signal to the light, a driving circuit configured to drive a plurality of pixels included in the pixel array, and a readout circuit configured to read an analog pixel signal of each pixel. The readout circuit may compare the analog pixel signal to a reference signal and generate a digital pixel signal (or an image signal) through analog-digital conversion. Here, a digital pixel signal of each pixel included in the pixel array includes an image signal, and the image signal may be defined as an image frame when the image signal is transmitted on a frame basis. That is, the image sensor may output a plurality of image frames.

The light receiving part 2 may include an image synthesizing part. The image synthesizing part may include an image processor configured to receive an image signal from the sensor 30 and process (e.g., interpolation, frame composition, etc.) the image signal. In particular, the image synthesizing part may synthesize an image signal (high resolution) of one frame using an image signal (low resolution) of a plurality of frames. That is, the image synthesizing part may synthesize a plurality of image frames included in an image signal received from the sensor 30 and may generate a synthesis image as a result of the synthesis. The synthesis image generated by the image synthesizing part may have a higher resolution than the plurality of image frames output from the sensor 30. That is, the image synthesizing part may generate a high-resolution image through a super resolution (SR) technique. The plurality of image frames may include image frames generated by differently changing the optical path through the movement of the filter 20.

The camera module may include a printed circuit board (PCB) 4. The light emitting part 1 and the light receiving part 2 may be disposed on the PCB 4. The PCB 4 may be electrically connected to the light emitting part 1 and the light receiving part 2.

The camera module may include a coupling part 3. The coupling part 3 may be electrically connected to the PCB 4. The coupling part 3 may be connected to elements of the optical device. The coupling part 3 may include a connector 7 to be connected to elements of the optical device. The coupling part 3 may include a substrate 5 connected to a connecting part 6, and the connector 7 is disposed on the substrate 5. The substrate 5 may be a PCB.

The camera module may include the connecting part 6. The connecting part 6 may connect the PCB 4 to the coupling part 3. The connecting part 6 may be flexible. The connecting part 6 may be a flexible PCB (FPCB).

The camera module may include a reinforcement plate 8. The reinforcement plate 8 may include a stiffener. The reinforcement plate 8 may be disposed on the lower surface of the PCB 4. The reinforcement plate 8 may be formed of stainless steel (SUS).

The camera module may include a lens driving apparatus. The camera module may include a voice coil motor (VCM). The camera module may include a lens driving motor. The camera module may include a lens driving actuator.

The camera module may include a tilt part that may provide three-dimensional tilt to the filter 20. The tilt part may tilt a filter to repeatedly move an optical path of an input light signal having passed through the filter according to a predetermined rule. To this end, the tilt part may include a tilt driver and a tilt actuator.

In the present embodiment, tilting driving principle of the camera module is as follows. Four driving parts using the Lorentz force may be applied to the camera module. As shown in FIG. 15, the Lorentz force in the positive (+) direction may be generated in a first driving part including a first coil 410 and a first magnet 310 and a third driving part including a third coil 430 and a third magnet 330, and the Lorentz force in the negative (−) direction may be generated in a second driving part including a second coil 420 and a second magnet 320 and a fourth driving part including a fourth coil 440 and a fourth magnet 340. In this case, an upper left corner portion may be tilted upward (see a in FIG. 15), and on the contrary, a lower right corner portion may be tilted downward (see b in FIG. 15). Subsequently, the Lorentz force in the positive (+) direction may be generated in the second driving part including the second coil 420 and the second magnet 320 and the third driving part including the third coil 430 and the third magnet 330, and the Lorentz force in the negative (−) direction may be generated in the first driving part including the first coil 410 and the first magnet 310 and the fourth driving part including the fourth coil 440 and the fourth magnet 340. In this case, an upper right corner portion may be tilted upward (see c in FIG. 15), and on the contrary, a lower left corner portion may be tilted downward (see d in FIG. 15). The Lorentz force in the negative (−) direction may be generated in the first driving part including the first coil 410 and the first magnet 310 and the third driving part including the third coil 430 and the third magnet 330, and Lorentz force in the positive (+) direction may be generated in the second driving part including the second coil 420 and the second magnet 320 and the fourth driving part including the fourth coil 440 and the fourth magnet 340. In this case, the lower right diagonal part may be tilted upward (see FIG. 15E), and on the contrary, the upper left corner portion may be tilted downward (see FIG. 15F). Subsequently, the Lorentz force in the negative (−) direction may be generated in the second driving part including the second coil 420 and the second magnet 320 and the third driving part including the third coil 430 and the third magnet 330, and the Lorentz force in the positive (+) direction may be generated in the first driving part including the first coil 410 and the first magnet 310 and the fourth driving part including the fourth coil 440 and the fourth magnet 340. In this case, the lower left corner portion may be tilted upward (see FIG. 15G), and on the contrary, the upper right corner portion may be tilted downward (see FIG. 15H). In the above description, the positive direction may be upward, and the negative direction may be downward. In the present embodiment, the tilting drive may be sequentially performed in four directions (upper left, upper right, lower right, and lower left).

In the present embodiment, by applying four driving parts, the force of the driving parts may be individually controlled, which is advantageous for precise control. Meanwhile, the tilting distance can be shortened because the tilting is vertically symmetrical.

The camera module may include a housing 100. The housing 100 may be disposed on the PCB 4. The housing 100 may be disposed above the PCB 4. The housing 100 may be disposed on an upper surface of the PCB 4. The housing 100 may accommodate a holder 200 therein. A lens module 10 may be coupled to the housing 100. The housing 100 may be a coil case to which a coil is to be fastened. A coil 400 and a substrate 500 may be attached to the housing 100. The housing 100 may be coupled to a barrel of the lens module 10. The housing 100 may integrally form an outer part 120 to which the coil 400 is to be coupled and an inner part 110 to which the lens module 10 is to be coupled. The housing 100 can reduce the size and the number of components through the above-described integrated structure. The housing 100 may be formed of a nonmagnetic material.

The housing 100 may include a base. In a variant, the camera module may include a base separate from the housing 100. In this case, the holder 200 may be spaced apart from the base. The base may be spaced apart from the sensor 30.

The housing 100 may include a first corner corresponding to a first corner of the holder 200, a second corner corresponding to a second corner of the holder 200, a third corner corresponding to a third corner of the holder 200, and a fourth corner corresponding to a fourth corner of the holder 200.

The housing 100 may include an inner part 110. The inner part 110 may be coupled to the lens module 10. The inner part 110 of the housing 100 may include a hole 111. The hole 111 may be hollow. The hole 111 may pass through the housing 100 in the optical axis direction. A screw thread 112 may be formed on an inner circumferential surface of the inner part 110. The screw thread 112 of the housing 100 may be coupled to a screen thread of the lens module 10. A curved surface may be disposed on an upper side of the screw thread 112 on the inner circumferential surface of the housing 100. An outer circumferential surface of the lens module 10 may include a curved surface opposite to and spaced apart from the curved surface of the inner circumferential surface of the housing 100.

The inner part 110 of the housing 100 may include a recessed part 113. The recessed part 113 may be a recess. The recessed part 113 may have a curvature corresponding to that of a protruding part 221. The recessed part 113 may be formed to avoid interference with the protruding part 221 of the holder 200. The housing 100 may include a first surface disposed inside the protruding part 221 of the holder 200 and opposite to the protruding part 221. The recessed part 113 having the curvature corresponding to that of the protruding part 221 may be formed on the first surface of the housing 100. Thus, the first surface of the housing 100 can avoid interference with the protruding part 221 of the holder 200.

The inner part 110 of the housing 100 may include a tapered surface 114. The tapered surface 114 may be formed on a lower end of the inner part 110 of the housing 100. Thus, the lower end of the inner part 110 of the housing 100 can avoid interference with the holder 200 upon movement of the holder 200. The tapered surface 114 of the housing 100 may be disposed opposite to and parallel to a tapered surface 212 of the holder 200.

The inner part 110 of the housing 100 may include a depression 115. The depression 115 may be provided to inform an assembler of an orientation during the assembly of the housing 100. One or more depressions 115 may be formed on a corner of the housing 100.

The housing 100 may include the outer part 120. The coil 400 may be disposed in the outer part 120. The outer part 120 may be disposed outside the inner part 110. The outer part 120 and the inner part 110 may be formed as separate members. The outer part 120 of the housing 100 may include a side wall. The side wall of the housing 100 may be disposed outside the holder 200.

The side wall of the housing 100 may include first to fourth side walls. The housing 100 may include first and second side walls disposed opposite to each other and third and fourth side walls disposed opposite to each other and between the first and second side walls.

The outer part 120 of the housing 100 may include a hole 121. The hole 121 of the housing 100 may have a shape corresponding to that of the coil 400. The shape of the hole 121 may be larger than the shape of the coil 400. The hole 121 may accommodate the coil 400. The side wall of the housing 100 may include the hole 121. The hole 121 may be formed in each of the first to fourth side walls.

The outer part 120 of the housing 100 may include a depression 122. An end portion of the coil 400 may be disposed in the depression 122. The depression 122 may include a first depression and a second depression. As a variant, only one of the first depression and the second depression may be formed in the housing 100. Any one or both of the first depression and the second depression may be omitted. The side wall of the housing 100 may include a first depression formed to be recessed upward in the hole 121 of the side wall of the housing 100 and a second depression formed to be recessed downward in the hole 121 of the side wall of the housing 100.

The outer part 120 of the housing 100 may include a stepped portion. The stepped portion may be formed on the side wall of the housing 100 to protrude from both sides of a terminal part 520 of the substrate 500. The stepped portion may overlap with the substrate 500 in the optical axis direction. The stepped portion may be disposed below a portion of the substrate 500. The stepped portion may include a first step 123 and a second step 124. The first step 123 may be formed to protrude from a corner of an external surface of the housing 100. The first step 123 may be formed in a shape corresponding to the substrate 500. The substrate 500 may be disposed on the first step 123. The second step 124 may be formed to protrude from an outer surface of the first step 123. The second step 124 may be formed in a shape corresponding to a side plate 720 of a cover 700. The side plate 720 of the cover 700 may be disposed on the second step 124.

The outer part 120 of the housing 100 may include a first protruding part 125. The first protruding part 125 may be formed on the side wall of the housing 100 to overlap with the substrate 500 in the optical axis direction. The first protruding part 125 may be disposed above an extending part 530 of the substrate 500. The first protruding part 125 may be disposed to correspond to an upper end of the substrate 500 to prevent the substrate 500 from falling upward.

The outer part 120 of the housing 100 may include a second protruding part 126. The second protruding part 126 may be formed on the side wall of the housing 100 to extend downward from an end portion of the first protruding part 125 of the side wall of the housing 100. The second protruding part 126 may overlap with the extending part 530 of the substrate 500 in the arrangement direction of the substrate 500. The second protruding part 126 may overlap with the extending part 530 of the substrate 500 in a direction vertical to the optical axis direction. The second protruding part 126 may guide the substrate 500 to be disposed at a proper position. The second protruding part 126 may be disposed on only one end portion of the first protruding part 125.

The outer part 120 of the housing 100 may include a protrusion 127. The protrusion 127 may be formed on an outer surface of the outer part 120 of the housing 100. The protrusion 127 may be inserted into a hole 511 of the substrate 500. The protrusion 127 may include a plurality of protrusions.

The outer part 120 of the housing 100 may include a protruding part 128. The protruding part 128 may be formed on a corner of the housing 100. The protruding part 128 may be formed on each of a first side wall near the corner and a second side wall near the corner. Both end portions of the substrate 500 may be disposed on the protruding part 128.

The outer part 120 of the housing 100 may include a protrusion 129. The protrusion 129 may be coupled to a second coupling part 620 of an elastic member 600. The protrusion 129 may be inserted into a hole of the second coupling part 620 of the elastic member 600.

The housing 100 may include a connecting part 130. The connecting part 130 may connect the inner part 110 and the outer part 120. At least a portion of the connecting part 130 may overlap the holder 200 in the optical axis direction. The connecting part 130 may be disposed above at least a portion of the holder 200.

The connecting part 130 of the housing 100 may include a hole 131. The hole 131 may be formed in the housing 100 in a first diagonal direction and a third diagonal direction of the filter 20. The hole 131 may be formed such that it does not interfere with the holder 200. At least a portion of the holder 200 may pass through the hole 131 of the housing 100. In this case, a part of the holder 200 that has passed through the hole 131 may be coupled to the elastic member 600.

The camera module may include the holder 200. The filter 20 may be disposed on the holder 200. The holder 200 may be integrally movable with the filter 20. The holder 200 may be connected to the elastic member 600. The holder 200 may be spaced apart from the housing 100. A magnet 300 may be disposed on the holder 200. The holder 200 may be a case in which the filter 20 and the magnet 300 are to be assembled. The holder 200 needs to be minimized in weight (size) because it is an actual driving part. In the present embodiment, in order for minimization in size to be achieved as shown in FIG. 12, the area of an attaching part 226 of the magnet 300 may be minimized. The holder 200 may use a nonmagnetic material to minimize the influence of magnetic force from the magnet 300. The holder 200 may be spaced apart from the base of the housing 100. The holder 200 may be coupled to the elastic member 600 and tilted in the first diagonal direction of the filter 20.

The holder 200 may include a first side surface, a second side surface disposed opposite to the first side surface, and third and fourth side surfaces disposed between the first side surface and the second side surface and opposite to each other. The holder 200 may include a first corner between the first side surface and the third side surface, a second corner between the second side surface and the third side surface, a third corner between the second side surface and the fourth side surface, and a fourth corner between the fourth side surface and the first side surface. The holder 200 may include a first corner part between the first side surface and the third side surface, a second corner part between the second side surface and the third side surface, a third corner part between the second side surface and the fourth side surface, and a fourth corner part between the fourth side surface and the first side surface.

The holder 200 may include a lower plate part 210. The filter 20 may be coupled to the lower plate part 210. The filter 20 may be adhered to a lower surface of the lower plate part 210 by an adhesive. The lower plate part 210 of the holder 200 may include a hole 211. The hole 211 may be hollow. The hole 211 may pass through the lower plate part 210 of the holder 200 in the optical axis direction.

The lower plate part 210 of the holder 200 may include a depression 213. The filter 20 may be disposed in the depression 213. The depression 213 may be formed in a shape corresponding to the filter 20. At least a portion of the filter 20 may be accommodated in the depression 213.

The lower plate part 210 of the holder 200 may include a vent depression 214. The vent depression 214 may be formed in the depression 213 of the lower plate part 210. Thus, the vent depression 214 may function as a passage for discharging gas that is generated while an adhesive adhering the filter 20 to the holder 200 or an adhesive disposed on another portion inside the camera module is cured.

The lower plate part 210 of the holder 200 may include a tapered surface 212. The tapered surface 212 may be formed on a part of the holder 200 in order to avoid interference with the housing 100 upon movement of the holder 200.

The holder 200 may include a side wall 220. The side wall 220 may extend upward from the lower plate part 210. The magnet 300 may be fastened to the side wall 220.

The side wall 220 of the holder 200 may include a protruding part 221. The protruding part 221 may be formed on an upper surface of the holder 200. The protruding part 221 may pass through the hole 131 of the housing 100. The protruding part 221 may be disposed in the hole 131 of the housing 100. The protruding part 221 may be coupled to a first coupling part 610 of the elastic member 600.

The side wall 220 of the holder 200 may include a protrusion 222. The protrusion 222 may be formed on an upper surface of the protruding part 221. The protrusion 222 may be coupled to the first coupling part 610 of the elastic member 600. The protrusion 222 may be inserted into a hole of the first coupling part 610 of the elastic member 600.

The side wall 220 of the holder 200 may include a depression 223. The depression 223 may be formed around the protruding part 221 on the upper surface of the holder 200. Thus, the holder 200 can avoid interference with the housing 100 upon movement of the holder 200. A protruding part 221 to be coupled to the elastic member 600 is on a corner of the holder 200, and a depression 223 for avoiding interference with the housing may be additionally formed around the protruding part 221. The depression 223 may be formed beside the protruding part 221. The depression 223 may be formed on both sides of the protruding part 221. The depression 223 may be formed on an upper surface of the side wall 220 of the holder 200. The depression 223 may be a recess.

The side wall 220 of the holder 200 may include a hole 224. The hole 224 may be formed at the center of the attaching part 226. That is, the attaching part 226 may be spaced apart therefrom. Thus, it is possible to minimize the size of the camera module in the horizontal direction. That is, a space may be secured through the hole 224 formed at the center of the attaching part 226, thereby preventing interference with the housing 100 and minimizing the size of the holder 200 in the horizontal direction.

The side wall 220 of the holder 200 may include a step 225. The step 225 may support an inner surface of the magnet 300. The inner surface of the magnet 300 may be disposed on a stepped surface of the step 225. The side wall 220 of the holder 200 may include the attaching part 226. The attaching part 226 may include the step 225. The magnet 300 may be adhered to the attaching part 226 by an adhesive. The attaching part 226 may fix the magnet 300.

The side wall 220 of the holder 200 may include a depression 227. The depression 227 may be formed on a lower end portion of an outer surface of a corner of the side wall 220 of the holder 200. The depression 227 may be formed to prevent the lower end of the corner of the side wall 220 of the holder 200 from interfering with the housing 100 while the holder 200 is being tilted diagonally.

The side wall 220 of the holder 200 may include a depression 228. The depression 228 may be formed on the depression 223 formed in the vicinity of the protruding part 221. In this case, the depression 223 may be referred to as a first depression or recess, and the depression 228 may be referred to as a second depression. The depression 228 may be provided to inform an assembler of the orientation during the assembly of the holder 200. One or more depressions 228 may be formed on a corner of the holder 200.

The camera module may include the magnet 300. The magnet 300 may be disposed on the holder 200. The magnet 300 may be disposed on an outer circumferential surface of the holder 200. The magnet 300 may protrude from an outer surface of the holder 200. The magnet 300 may face the coil 400. The magnet 300 may electromagnetically interact with the coil 400. The magnet 300 may be disposed on the side wall 220 of the holder 200. In this case, the magnet 300 may be a flat magnet having a flat plate shape. As a variant, the magnet 300 may be disposed on a corner part between the side walls 220 of the holder 200. In this case, the magnet 300 may be a core magnet having a hexahedral shape in which an inner side surface is wider than an outer side surface.

In the present embodiment, the filter 20 may be tilted by the Lorentz force acting on the coil through which current flows and the magnet 300. In order to generate the Lorentz force, an actuator may be largely divided into a magnet part and a coil part. A portion that actually operates when the Lorentz force is generated may be the magnet 300. However, as a variant, the coil 400 may be moved by the Lorentz force. In order to vertically drive the coil 400, the magnet 300 may be positively magnetized to have two polarity as shown in FIG. 14B. That is, the magnet 300 may have a form in which magnets each having two polarity are stacked.

The magnet 300 may include a plurality of magnets. The magnet 300 may include four magnets. The magnet 300 may include first to fourth magnets 310, 320, 330, and 340. The magnet 300 may include the first magnet 310, the second magnet 320 disposed opposite to the first magnet 310, the third magnet 330, and the fourth magnet 340 disposed opposite to the third magnet 330. The first magnet 310 may be disposed on a first side surface of the holder 200, the second magnet 320 may be disposed on a second side surface of the holder 200, the third magnet 330 may be disposed on a third side surface of the holder 200, and the fourth magnet 340 may be disposed on a fourth side surface of the holder 200.

The camera module may include a coil 400. The coil 400 may face the magnet 300. The coil 400 may be disposed to face the magnet 300. The coil 400 may electromagnetically interact with the magnet 300. In this case, when a current is supplied to the coil 400 to form an electromagnetic field around the coil 400, the magnet 300 may move with respect to the coil 400 due to the electromagnetic interaction between the coil 400 and the magnet 300. The coil 400 may be coupled to an inner surface of the substrate 500. The coil 400 may be disposed in the hole 121 of the side wall of the housing 100. The coil 400 and the magnet 300 may be disposed at positions opposite to each other.

The coil 400 may include a pair of end portions (leader lines) for power supply. In this case, a first end portion 401 of the coil 400 may be drawn upward from the coil 400, and a second end portion 402 of the coil 400 may be drawn downward from the coil 400. The coil 400 may include the first end portion 401 and the second end portion 402 coupled to the substrate 500. As shown in FIG. 11A, the first end portion 401 and the second end portion 402 of the coil 400 may be coupled to a terminal 512 of the substrate 500. In this case, the first end portion 401 and the second end portion 402 of the coil 400 may be coupled to the terminal 512 of the substrate 500 by soldering or Ag epoxy. That is, the coil 400 may be coupled to the substrate 500 through manual soldering. Meanwhile, as a variant, as shown in FIG. 11B, the first end portion 401 and the second end portion 402 of the coil 400 may be coupled to the terminal 512 of the substrate 500 through a separate coupling member 405. The coupling member 405 may be a coil support. The coil 400 may be mounted on the substrate through Surface Mount Technology (SMT) by applying the coupling member 405. In this case, there is an advantage in that the ease of assembly due to reduction in manual solder placement workability and work-time is increased, and also there is another advantage in that the positional deviation tolerance of the coil 400 is decreased compared to manual soldering. Thus, it is possible to prevent center deviation between the coil 400 and the magnet 300. The first end portion 401 of the coil 400 may be disposed in the first depression of the housing 100, and the second end portion 402 of the coil 400 may be disposed in the second depression of the housing 100. In this case, a conductive material and/or the coupling member 405 connected to the first and second end portions 401 and 402 may be disposed in the depression 122 of the housing 100.

As shown in FIG. 14C, a current that generates the Lorentz force may flow through the coil 400 in one direction (see (a) of FIG. 14C). A current may flow through the coil 400 in a forward direction. Meanwhile, a current may flow through the coil 400 in the other direction opposite the one direction. That is, a current may flow through the coil 400 in a reverse direction. As shown in FIG. 14, an N-pole may be disposed in an outer region of an upper surface of the magnet 300 and a current may be allowed to flow in one direction. Thus, a driving direction may be oriented upward (see (c) in FIG. 14A) according to the Lorentz force.

The coil 400 may include a plurality of coils. The coil 400 may include four coils. The coil 400 may include first to fourth coils 410, 420, 430, and 440. A current may be applied to each of the first to fourth coils 410, 420, 430, and 440. A current may be individually applied to each of the first to fourth coils 410, 420, 430, and 440. The first to fourth coils 410, 420, 430, and 440 may be electrically separated from each other. The coil 400 may include the first coil 410 opposite to the first magnet 310, the second coil 420 opposite to the second magnet 320, the third coil 430 opposite to the third magnet 330, and the fourth coil 440 opposite to the fourth magnet 340. The first to fourth coils 410, 420, 430, and 440 may be coupled to the housing 100. The coil 400 may include a first coil 410 disposed in a hole 121 of a first side wall of the housing 100, a second coil 420 disposed in a hole 121 of a second side wall of the housing 100, a third coil 430 disposed in a hole 121 of a third side wall of the housing 100, and a fourth coil 440 disposed in a hole 121 of a fourth side wall of the housing 100.

In the present embodiment, the four coils may be controlled through two channels. The first coil 410 and the second coil 420 may be electrically connected to each other. However, the direction of the Lorentz force generated between the first coil 410 and the first magnet 310 and the direction of the Lorentz force generated between the second coil 420 and the second magnet 320 may be opposite to each other. As an example, the first coil 410 and the second coil 420 may be disposed such that the opposite currents flow through the coils. Alternatively, the first coil 410 and the second coil 420 may be wound in the opposite directions. Alternatively, the first coil 410 and the second coil 420 may be wound in the same direction, and the first magnet 310 and the second magnet 320 may be disposed to have different polarity arrangements. Meanwhile, the first coil 410 and the second coil 420 may be electrically separated from each other and may be integrally controlled by a control unit.

The third coil 430 and the fourth coil 440 may be electrically connected to each other. However, the direction of the Lorentz force generated between the third coil 430 and the third magnet 330 and the direction of the Lorentz force generated between the fourth coil 440 and the fourth magnet 340 may be opposite to each other. The third coil 430 and the fourth coil 440 may be disposed such that the opposite currents flow through the coils. As an example, the third coil 430 and the fourth coil 440 may be wound in the opposite directions. Alternatively, the third coil 430 and the fourth coil 440 may be wound in the same direction, and the third magnet 330 and the fourth magnet 340 may be disposed to have different polarity arrangements. Meanwhile, the third coil 430 and the fourth coil 440 may be electrically separated from each other and may be integrally controlled by the control unit.

The camera module may include a sensor 450. The sensor 450 may be used for feedback control. The sensor 450 may include a hole sensor or a hole integrated circuit (IC). The sensor 450 may sense the magnet 300. The sensor 450 may sense a magnetic field of the magnet 300. The sensor 450 may be disposed between the coils 400. The sensor 450 may be disposed on an inner surface of the substrate 500.

The sensor 450 may include a plurality of sensors. The sensor 450 may include two sensors. The sensor 450 may include first and second sensors 451 and 452. The first sensor 451 and the second sensor 452 may be disposed such that their orientations are vertical. Thus, the first sensor 451 and the second sensor 452 may sense x-axis and y-axis movements of the magnet in the horizontal direction. In the present embodiment, an additional sensor for sensing a z-axis (vertical or optical axis direction) movement of the magnet may be further provided.

The camera module may include a substrate 500. The substrate 500 may be a flexible printed circuit board (FPCB). The substrate 500 may be disposed in the housing 100. The substrate 500 may be disposed on an outer surface of a side wall of the housing 100. The substrate 500 may be disposed between the side wall of the housing 100 and the side plate 720 of the cover 700. The substrate 500 may be joined to the first step 123, the first protruding part 125, the second protruding part 126, the protrusion 127, and the protruding part 128 of the housing 100. The substrate 500 may be disposed to surround outer surfaces of the four side walls of the housing 100. In the present embodiment, by applying a position control guide between the substrate 500 and the housing 100, it is possible to prevent a positional deviation of the coil 400.

The substrate 500 may be connected to a printed circuit board 4, which is a main substrate, to apply a signal to the coil 400 after the coil 400 is assembled. The substrate 500 may be fastened to the housing 100, which is a coil case, to stably fasten the coil 400 to the substrate 500. Also, a sensor 450 for sensing the position of the magnet 300 may be coupled to the substrate 500. The substrate 500 may be an FPCB. The sensor 450 and the coil 400 may be mounted on the substrate 500 through the SMT. In the present embodiment, the sensor 450 is coupled to the substrate 500, and thus there is no need for a separate component for energizing the sensor 450 structurally. In the present embodiment, by placing the substrate 500 on the outside of the housing 100 to solder the printed circuit board 4 and the terminal part 520 of the substrate 500, it is possible to minimize the space required for the connection.

The substrate 500 may include first to fourth parts 501, 502, 503, and 504. The substrate 500 may include a first part 501 disposed on the first side wall of the housing 100, a second part 502 disposed on the second side wall of the housing 100, a third part 503 disposed on the third side wall of the housing 100, and a fourth part 504 disposed on the third side wall of the housing 100. The third part 503 of the substrate 500 may connect the first part 501 of the substrate 500 to the second part 502 of the substrate 500. The second part 502 of the substrate 500 may connect the third part 503 of the substrate 500 to the fourth part 504 of the substrate 500. The first part 501 and the fourth part 504 of the substrate 500 may be spaced apart from each other. An end portion of the first part 501 of the substrate 500 and an end portion of the fourth part 504 of the substrate 500 may be disposed on a protruding part 128 formed to protrude on a corner at which the first side wall and the fourth side wall of the housing 100 meet each other.

The substrate 500 may include a body part 510. The coil 400 may be coupled to the body part 510. The sensor 450 may be coupled to the body part 510. The body part 510 may be disposed on an outer surface of the housing 100. The body part 510 of the substrate 500 may include a hole 711. The hole 711 may be coupled to the protrusion 127 of the housing 100.

The substrate 500 may include a terminal part 520. The terminal part 520 may extend downward from the body part 510 and may include a plurality of terminals. The terminal part 520 may be coupled to the printed circuit board 4 by soldering. The terminal part 520 may be formed on a lower end of the substrate 500. The terminal part 520 may be disposed between the stepped portions of the housing 100.

The substrate 500 may include an extending part 530. The extending part 530 may extend upward from the body part 510. The extending part 530 may form an upper end portion of the substrate 500. The extending part 530 may be formed in a shape and size corresponding to the first protruding part 125 and the second protruding part 126 of the housing 100. In a variant, the extending part 530 may be omitted from the substrate 500, and the first protruding part 125 may be disposed above the body part 510.

The camera module may include an elastic member 600. The elastic member 600 may be connected to the housing 100. The elastic member 600 may connect the holder 200 to the housing 100. The elastic member 600 may have elasticity. The elastic member 600 may include a portion that has elasticity. The elastic member 600 may include a leaf spring. The elastic member 600 may be formed of a metal material.

The elastic member 600 may connect the magnet part including the magnet 300, the holder 200, and the coil part including the coil 400 to the housing 100. The elastic member 600 may serve to control the driving of the coil part. As shown in FIGS. 16 to 18, the elastic member 600 may be fastened to the protrusion 129 of the housing 100 and the protrusion 222 of the protruding part 221 of the holder 200 through bonding after assembly. In the present embodiment, since an assembling and fastening part of the elastic member 600 is outside, the elastic member 600 may have a structure that can be relatively easily assembled. In the present embodiment, the elastic member 600 may have a structure in which the spring position can have the vertical degree of freedom. Depending on the embodiment, the elastic member 600 may be placed on either or both of upper and lower sides.

The elastic member 600 may include the first coupling part 610. The first coupling part 610 of the elastic member 600 may be coupled to a corner of the holder 200. The first coupling part 610 of the elastic member 600 may include two first coupling parts. The two first coupling parts may be disposed along a first diagonal direction of the filter 20 to be symmetrical with respect to the optical axis. The two first coupling parts may be disposed on the opposite sides with respect to the optical axis. The first coupling part 610 of the elastic member 600 may be coupled to the first corner of the holder 200 and the third corner of the holder 200.

The elastic member 600 may include the second coupling part 620. The second coupling part 620 of the elastic member 600 may be coupled to a corner of the housing 100 corresponding to another corner of the holder 200 adjacent to the corner of the holder 200 to which the first coupling part 610 is to be coupled. The second coupling part 620 of the elastic member 600 may include two second coupling parts. The two second coupling parts may be disposed along a second diagonal direction different from the first diagonal direction of the filter 20 to be symmetrical with respect to the optical axis. The two second coupling parts may be disposed on the opposite sides with respect to the optical axis. The second coupling part 620 of the elastic member 600 may be coupled to the second corner of the housing 100 and the fourth corner of the housing 100.

The elastic member 600 may include the connecting part 630. The connecting part 630 may connect the first coupling part 610 to the second coupling part 620. The connecting part 630 may elastically connect the first coupling part 610 to the second coupling part 620. The connecting part 630 may have elasticity. The connecting part 630 may include a bent portion.

The elastic member 600 may be an upper elastic member to be coupled to an upper portion of the housing 100 and an upper portion of the holder 200. In this case, the upper elastic member may be referred to as a "first elastic member" or "second elastic member." The upper elastic member may include a first coupling part 610 to be coupled to the upper portion of the holder 200, a second coupling part 620 to be coupled to the upper portion of the housing 100, and a connecting part 630 configured to connect the first coupling part 610 and the second coupling part 620.

The elastic member 600 may be formed in various shapes to find optimal shape and stiffness.

In the present embodiment, the connecting part 630 of the elastic member 600 may be formed in a straight shape as shown in FIG. 16. However, the connecting part 630 may be rounded at a point where the first coupling part 610 and the second coupling part 620 meet.

In a variant, as shown in FIG. 17, a connecting part 630 of an elastic member 600-1 may include a plurality of bent portions 631. However, each of the bent portions 631 may be a portion formed in a zigzag shape, not a folded portion. The connecting part 630 of the elastic member 600-1 may include a bent portion or a rounded portion. In a variant, the plurality of bent portions 631 may be continuously formed in the longitudinal direction of the connecting part 630.

In another variant, as shown in FIG. 18, a connecting part 630 of an elastic member 600-2 may include a first bent portion 632 and a second bent portion 633. Unlike the above-described variant in which the bent portion 631 is continuously formed, the first bent portion 632 and the second bent portion 633 may be discontinuously formed.

In still another variant, as shown in FIG. 19, the camera module may include a lower elastic member 600-3. The lower elastic member 600-3 may be referred to as a "first elastic member" or "second elastic member." The lower elastic member 600-3 may be coupled to a lower portion of the housing 100 and a lower portion of the holder 200. The lower elastic member 600-3 may include a first coupling part 610 to be coupled to the lower portion of the holder 200, a second coupling part 620 to be coupled to the lower portion of the housing 100, and a connecting part 630 configured to connect the first coupling part 610 and the second coupling part 620. The connecting part 630 of the lower elastic member 600-3 may include a first bent portion 634 and a second bent portion 635. In this case, the first bent portion 634 and the second bent portion 635 may be discontinuously formed as shown in FIG. 19. However, as a variant, the connecting part 630 of the lower elastic member 600-3 may include a continuous bent portion like the elastic member 600-1 of FIG. 17. Alternatively, as another variant, the connecting part 630 of the lower elastic member 600-3 may be formed as a straight portion with no bent portions like the elastic member 600 of FIG. 16.

The coupling part 610 of the lower elastic member 600-3 may be coupled to another corner (a corner different from the corner to which the first coupling part 610 of the upper elastic member is coupled) of the holder 200. The first coupling part 610 of the lower elastic member 600-3 may be coupled to a first protruding part 221-1 disposed on the first corner of the holder 200, and the second coupling part 620 of the lower elastic member 600-3 may be coupled to a second protrusion 129-1 disposed on the second corner of the housing 100.

In the present embodiment, the upper elastic member may be coupled to the housing 100 along the first diagonal direction of the filter 20 and may be coupled to the holder 200 along the second diagonal direction of the filter 20. In this case, the lower elastic member 600-3 may be coupled to the housing 100 along the second diagonal direction of the filter 20 and may be coupled to the holder 200 along the first diagonal direction of the filter 20. That is, the diagonal direction in which the coupling of the upper elastic member is made may be different from the diagonal direction in which the coupling of the lower elastic member is made. Thus, it is possible to prevent the tilt in the initial state of the holder 200, and it is also possible to control all the four diagonal directions using the same current.

Meanwhile, the shapes of the substrate 500 in the variants shown in FIGS. 17 to 19 may be different from that of the present embodiment shown in FIG. 16.

The camera module may include a cover 700. The cover 700 may be a bracket. The cover 700 may include a cover can. The cover 700 may be placed to surround the housing 100. The cover 700 may be coupled to the housing 100. The cover 700 may accommodate the housing 100 therein. The cover 700 may form an external appearance of the camera module. The cover 700 may have a hexahedral shape with an open lower surface. The cover 700 may be non-magnetic. The cover 700 may be formed of a metal. The cover 700 may be formed of a metal plate. The cover 700 may be connected to a ground part of the printed circuit board 4. Thus, the cover 700 may be grounded. The cover 700 may block electromagnetic interference (EMI). In this case, the cover 700 may be referred to as an "EMI shield can." The cover 700 is a finally assembled component and may be protect the product from external impact. The cover 700 may be formed of a thin material with high stiffness.

The cover 700 may include an upper plate 710 and a side plate 720. The cover 700 may include an upper plate 710 including a hole 711 and a side plate 720 extending downward from an outer periphery or edge of the upper plate 710. A lower end of the side plate 720 of the cover 700 may be disposed on the second step 124 of the housing 100. An inner surface of the side plate 720 of the cover 700 may be fastened to the housing by an adhesive. The upper plate 710 of the cover 700 may include a hole 711 corresponding to the hole 211 of the holder 200.

The cover 700 may serve to support the substrate 500 and the coil 400 so that the substrate 500 and the coil 400 are not pushed by the Lorentz force. The cover 700 may serve to dissipate heat generated from the coil 400 through conduction. The side plate 720 of the cover 700 may include a bent portion 721 formed by bending a portion of the side plate 720 of the cover 700 inward and bringing the side plate 720 into contact with the outer surface of the substrate 500. The bent portion 721 may include one or more of a pushed portion, a pressed portion, and a recessed portion. In the present embodiment, the coil 400, the substrate 500, and the metal cover 700 may be connected through a substrate 500 contact structure of the bent portion 721, which is a heat dissipation optimization structure, to dissipate heat generated in the coil 400 to the outside through conduction (see (a) of FIG. 21B). Compared to a comparative example of FIG. 22A, it can be seen that the internal temperature of the camera module is lowered in the present embodiment of FIG. 22B. In particular, the temperature of a part that had been measured at 46.9° C. in the comparative example was measured at 41.4° C. in the present embodiment. From this, it can be seen that there is a temperature improvement effect of about 10%.

The side plate 720 of the cover 700 may include a plurality of side plates. The plurality of side plates may include first to fourth side plates. The side plate 720 of the cover 700 may include first and second side plates disposed opposite to each other and third and fourth side plates disposed opposite to each other and between the first and second side plates.

In the present embodiment, the stiffness of the elastic member 600 may range from 53 mN/mm to 80 mN/mm. In this case, the stiffness of the elastic member 600 may be the stiffness of the connecting part 630 of the elastic member 600. When the stiffness of the elastic member 600 is less than 53 mN/mm, a problem may arise in that a target tilting angle is exceeded even if an electric current level is lowered when a value measured in an analysis operation is referenced. 80 mN/mm may be the largest value in a limited space of the present embodiment. Also, the present disclosure may be applied to the elastic members 600-1 and 600-2 and the lower elastic member 600-3 according to the variants of the present embodiment.

In the present embodiment, the level of a current applied to the coil 400 may range from 18 mA to 22 mA. When the current applied to the coil 400 is less than 18 mA, a problem may arise in that a tilting angle is small when the stiffness of the elastic member 600 is 53 mA/mm upon an analysis operation test. When the current applied to the coil 400 is greater than 22 mA, the amount of current consumed may be large, and heat may be generated in the coil.

FIG. 23 is a diagram illustrating a tilt part according to the present embodiment.

As shown in FIG. 23, the camera module may include a tilt part 800 configured to tilt a filter in three dimensions. As described above, the tilt part 800 may tilt a filter to repeatedly move an optical path of an input light signal having passed through the filter according to a predetermined rule.

The predetermined rule may include first to fourth tilt sequences. The first to fourth tilt sequences may enable the optical path of the input light signal having passed through the filter to be placed at different positions. The first to fourth tilt sequences may enable the optical path of the input light signal having passed through the filter to move in different diagonal directions.

The tilt part 800 may tilt the filter to move the optical path of the input light signal having passed through the filter to move toward an upper left portion of a sensor according to the first tilt sequence. The tilt part 800 may tilt the filter to move the optical path of the input light signal having passed through the filter to move toward an upper right portion of the sensor according to the second tilt sequence. The tilt part 800 may tilt the filter to move the optical path of the input light signal having passed through the filter to move toward a lower right portion of the sensor according to the third tilt sequence. The tilt part 800 may tilt the filter to move the optical path of the input light signal having passed through the filter to move toward a lower left portion of the sensor according to the fourth tilt sequence.

The tilt part 800 may tilt the filter according to the first tilt sequence such that a line segment formed by a center point and an upper left vertex of the filter forms a positive tilting angle with respect to a reference surface, which is a surface of an IR filter before the tilting, and a line segment formed by the center point and a lower right vertex of the filter forms a negative tilting angle with respect to the reference surface. The tilt part 800 may tilt the filter according to the second tilt sequence such that a line segment formed by the center point and an upper right vertex of the filter forms a positive tilting angle with respect to a reference surface, which is a surface of the IR filter before the tilting, and a line segment formed by the center point and a lower left vertex of the filter forms a negative tilting angle with respect to the reference surface. The tilt part 800 may tilt the filter according to the third tilt sequence such that a line segment formed by the center point and a lower right vertex of the filter forms a positive tilting angle with respect to a reference surface, which is a surface of the IR filter before the tilting, and a line segment formed by the center point and an upper left vertex of the filter forms a negative tilting angle with respect to the reference surface. The tilt part 800 may tilt the filter according to the fourth tilt sequence such that a line segment formed by the center point and a lower left vertex of the filter form a positive tilting angle with respect to a reference surface, which is a surface of the IR filter before the tilting, and a line segment formed by the center point and an upper right vertex of the filter form a negative tilting angle with respect to the reference surface.

The tilt part 800 may tilt the filter such that any one combination in which the first to fourth tilt sequences are sequentially performed is repeated. For example, the tilt part 800 may tilt the filter such that a predetermined rule having the order of the first tilt sequence, the second tilt sequence, the third tilt sequence, and the fourth tilt sequence is repeated. As another example, the tilt part 800 may tilt the filter such that a predetermined rule having the order of the second tilt sequence, the third tilt sequence, the fourth tilt sequence, and the first tilt sequence is repeated. As still another example, the tilt part 800 may tilt the filter such that a predetermined rule having the order of the first tilt sequence, the third tilt sequence, the second tilt sequence, and the fourth tilt sequence is repeated.

In order to implement the above function, the tilt part 800 may include a tilt driver 820 and a tilt actuator 830 and may further include a tilt controller 810.

The tilt controller 810 may generate a control signal for controlling the driving of the tilt driver 820. The tilt controller 810 may be a micro controller unit (MCU) capable of generating a control signal, but the present invention is not limited thereto. The tilt controller 810 may input the generated control signal to the tilt driver 820. The tilt controller 810 may transmit and receive a control signal to and from the tilt driver 820 through an inter-integrated circuit (I2C) communication scheme. For example, in the I2C communication, the tilt controller 810 may be a device in a master mode, and the tilt driver 820 may be a device in a slave mode. The tilt controller 810 in the master mode may transmit a control signal to the tilt driver 820 in the slave mode. To this end, the tilt controller 810 may be connected to a serial clock (SCL) communication line and a serial data (SDA) communication line. The tilt controller 810 communicating with the tilt driver 820 through the I2C scheme is merely an example, and the present invention is not limited thereto.

The tilt controller 810 may control on/off of the tilt driver 820 by means of the control signal. That is, the control signal may include information for controlling the start and stop operations of the tilt driver 820. The tilt controller 810 may control the voltage level of an output signal of the tilt driver 820 by means of the control signal. That is, the control signal may include information for controlling the voltage level of an output signal of the tilt driver 820. The tilt controller 810 may control a delay time by means of the control signal. That is, the control signal may include control information for the delay time. Here, the delay time may refer to an interval between a time point at which a specific waveform of a trigger signal occurs and a time point at which a specific waveform of an output signal occurs. The tilt controller 810 may control a frame time by means of the control signal. That is, the control signal may include control information regarding the frame time. Here, the frame time may refer to a time taken for a camera apparatus to generate one image frame and may be a period in which a specific waveform occurs in the trigger signal.

Meanwhile, the tilt controller 810 may be disposed outside the camera module as shown in FIG. 23A. For example, when the camera module is installed in a mobile terminal, the tilt controller 810 may be disposed in the mobile terminal. In this case, the tilt part 800 included in the camera module may include the tilt driver 820 and the tilt actuator 830. As another embodiment, the tilt controller 810 may be included in the tilt part 800 as shown in FIG. 23B. For example, the tilt controller 810 may be disposed in one space of the camera module. In this case, the tilt part 800 included in the camera module may include the tilt controller 810, the tilt driver 820, and the tilt actuator 830.

The tilt driver 820 may generate an output signal synchronized with an exposure period of a sensor on the basis of a trigger signal received from the sensor.

The tilt driver 820 may receive a voltage from the camera module. The tilt driver 820 may receive a first voltage and a second voltage branched from a voltage supplied from the camera module. The tilt part 800 may further include an inductor in order to branch a voltage input from a power source of the camera module into a first voltage and a second voltage. The branched first voltage and second voltage may be input to the tilt driver 820. The first voltage may be a voltage used to drive the tilt driver 820, and the second voltage may be a voltage used to drive the tilt actuator 830. The first voltage and the second voltage may have the same magnitude and may be a direct-current voltage of 3.3 V, but the present invention is not limited thereto. The tilt driver 820 may include a first power source input terminal for receiving the first voltage and a second power source input terminal for receiving the second voltage.

The tilt driver 820 may receive a trigger signal. The trigger signal may be output from a sensor, that is, an image sensor. The trigger signal may be a square wave signal of a certain period. The tilt driver 820 may use a trigger signal to synchronize the driving period of the tilt actuator 830 with the driving period of the sensor. The tilt driver 820 may include a terminal for receiving a trigger signal.

The tilt driver 820 may receive a control signal from the tilt controller 810. The tilt driver 820 may include a communication connection terminal for communication connection to the tilt driver 820. When the I2C communication scheme is used, the communication connection terminal may include two terminals.

The tilt driver 820 may generate an output signal on the basis of the control signal received from the tilt controller 810 and the voltage and trigger signal received from the camera module. A detailed description of the output signal generation will be given below with reference to the drawings.

The tilt driver 820 may output the output signal to the tilt actuator 830. The output signal is a signal having two channels and may include a first output signal and a second output signal. Accordingly, the tilt driver 820 may include a first output terminal for outputting the first output signal and a second output terminal for outputting the second output signal, and the terminals may be connected to the tilt actuator 830 through a signal line.

The tilt actuator 830 may tilt the filter diagonally by means of the output signal. The tilt actuator 830 may include first to fourth driving parts, each of which may include one coil and one magnet. The first output signal may be input to the first driving part and the third driving part. In detail, the first output signal may be input to a first coil of the first driving part and a third coil of the third driving part. The second output signal may be input to the second driving part and the fourth driving part. In detail, the first output signal may be input to a second coil of the second driving part and a fourth coil of the fourth driving part. That is, the tilt actuator 830 may tilt the filter 20 diagonally through the output signal including the first output signal and the second output signal.

FIG. 24 is a diagram illustrating the tilt actuator in detail.

FIG. 24A shows that the first to fourth coils of the tilt actuator 830 are arranged on the substrate 500. The first to fourth coils may be disposed on the substrate 500 and spaced a predetermined distance from one another. The substrate 500 may be folded between the first coil and the second coil, between the second coil and the third coil, and between the third coil and the fourth coil.

The opposite coils among the first to fourth coils may be formed in an anti-parallel structure in which the directions of the currents flowing through the coils are opposite to each other. That is, the first coil and the third coil may be formed in the anti-parallel structure, and the second coil and the fourth coil may be formed in the anti-parallel structure. Since the first coil and the third coil have the anti-parallel structure, the current $I_1$ flowing through the first coil and the current $I_3$ flowing through the third coil may have the anti-parallel structure ($I_1 = -I_3$). Since the second coil and the fourth coil have the anti-parallel structure, the current $I_2$ flowing through the second coil and the current $I_4$ flowing through the fourth coil may have the anti-parallel structure ($I_2 = -I_4$).

FIG. 24B shows a printed circuit board 4 having a substrate where the first to fourth coils are disposed. A pad on which the tilt actuator 830 is mounted may be disposed at a position where a light receiving part of the printed circuit board 4 is to be disposed. The pad may include a first pad and a second pad to be disposed at a position opposite to that of the first pad.

FIG. 24C shows that the substrate where the first to fourth coils shown in FIG. 24A are disposed is coupled to the printed circuit board 4. The substrate where the first to fourth coils shown in FIG. 24A are disposed may have a rectangular shape folded at regular intervals and at a certain angle. The rectangular substrate where the first to fourth coils are disposed may be coupled onto the printed circuit board 4. The first pad and the second pad disposed on the printed circuit board 4 may be coupled to a portion of the substrate where the first coil and the second coil are disposed. In this case, the substrate and the printed circuit board 4 may be coupled to each other by soldering the first pad part and the second pad part. The first to fourth magnets may be disposed to correspond to the first to fourth coils, respectively. A first output signal X may be input to the first coil and the third coil. A second output signal Y may be input to the second coil and the fourth coil.

FIG. 25 is a diagram illustrating a driving sequence of the tilt part.

FIG. 25 shows a first output signal and a second output signal generated according to a trigger signal. The first output signal may be input to the first coil and the third coil, and the second output signal may be input to the second coil and the fourth coil.

As shown in FIG. 25, the trigger signal may be a square wave signal in which pulses are generated in a certain period. The pulse interval (i.e., the pulse period) of the trigger signal may be one image frame interval. An interval from the rising edge of a pulse of the trigger signal to the rising edge of the next pulse of the trigger signal may be one image frame interval. The pulse width of the trigger signal may be set to be less than one image frame interval.

Before the driving sequence of the tilt actuator 830 is started, that is, when the driving sequence is in a default state, the current levels of the first output signal and the second output signal may be zero-level. Here, the zero-level may refer to a current of 0 A, but the present invention is not limited thereto.

When the driving sequence of the tilt actuator 830 is started, the current levels of the first output signal and the second output signal are controlled at a predetermined delay time (Delay T) after the falling edge of a pulse of the trigger signal. The current levels of the first output signal and the second output signal may be controlled every frame interval. The first output signal and the second output signal may be controlled to having a high-level current or a low-level current every frame interval. The high-level current may refer to a current higher than a reference level current, and the low-level current may refer to a current lower than the reference level current. For example, when the reference level is set to be 0 A, the high level may refer to a current having a positive (+) value, and the low level may refer to a current having a negative (−) value. When the current level of the output signal varies in consecutive steps, it may take a predetermined time to raise or lower the current level.

Table 1 below is a table that shows the first output signal and the second output signal shown in FIG. 25.

TABLE 1

| STEP | First Output Signal (X) | Second Output Signal(Y) |
|---|---|---|
| 1 | (−) | (+) |
| 2 | (+) | (+) |
| 3 | (+) | (−) |
| 4 | (−) | (−) |

In Table 1, (−) indicates a low-level current, and (+) indicates a high-level current. STEP 1 indicates a first tilt sequence, STEP 2 indicates a second tilt sequence, STEP 3 indicates a third tilt sequence, and STEP 4 indicates a fourth tilt sequence.

When the driving sequence of the tilt actuator 830 is started, the current levels of the first output signal and the second output signal may be controlled at a predetermined delay time after the falling edge of the first pulse (STEP 1). The first output signal may be controlled to change from the reference level current to the low-level current. The second output signal may be controlled to change from the reference level current to the high-level current. That is, in STEP 1, the first output signal may be controlled to have the low-level current, and the second output signal may be controlled to have the high-level current.

At a predetermined delay time after the falling edge of the second pulse, the current levels of the first output signal and the second output signal may be controlled (STEP 2). The first output signal may be controlled to change from the low-level current controlled in STEP 1 to the high-level current. The second output signal may be controlled to remain at the high-level current controlled in STEP 1. That is, in STEP 2, the first output signal may be controlled to have the high-level current, and the second output signal may be controlled to have the high-level current.

At a predetermined delay time after the falling edge of the third pulse, the current levels of the first output signal and the second output signal may be controlled (STEP 3). The first output signal may be controlled to remain at the high-level current controlled in STEP 2. The second output signal may be controlled to change from the high-level current controlled in STEP 2 to the low-level current. That is, in STEP 3, the first output signal may be controlled to have the high-level current, and the second output signal may be controlled to have the low-level current.

At a predetermined delay time after the falling edge of the fourth pulse, the current levels of the first output signal and the second output signal may be controlled (STEP 4). The first output signal may be controlled to change from the high-level current controlled in STEP 3 to the low-level current. The second output signal may be controlled to remain at the low-level current controlled in STEP 3. That is, in STEP 4, the first output signal may be controlled to have the low-level current, and the second output signal may be controlled to have the low-level current.

STEPS 1 to 4 may operate as one cycle and may be continuously repeated while the driving sequence of the tilt actuator 830 is operated.

Table 2 below shows another example of the driving sequence of the tilt actuator 830.

TABLE 2

| STEP | First Output Signal (X) | Second Output Signal(Y) |
|---|---|---|
| 1 | (+) | (+) |
| 2 | (+) | (−) |
| 3 | (−) | (−) |
| 4 | (−) | (+) |

As shown in Table 2, the STEP-specific current levels of the first output signal and the second output signal which have been described with reference to Table 1 and FIG. 25 are merely an embodiment and may be set in another combination. To this end, the STEP-specific current levels of the first output signal and the second output signal may be set by means of a control signal of the tilt controller 810.

FIGS. 26 to 28 show a light path movement process according to an embodiment of the present invention.

First, in STEP 0 (neutral sequence), which is before the driving sequence of the tilt actuator 830 is started, the filter may remain untilted. FIG. 27A shows an optical path of input light in STEP 0. In FIG. 27, a point indicates the center of a pixel with respect to the input light. In STEP 0, the center of the pixel with respect to the input light and the center of the pixel with respect to a sensor may match each other. That is, it means that the optical path of light passing through the filter does not change.

When the driving sequence of the tilt actuator 830 is started, the tilt actuator 830 may tilt the filter in STEP 1. Due to the tilting in STEP 1, the upper left portion of the filter may rise above a reference surface, and the lower right portion of the filter may fall below the reference surface. The reference surface may refer to a surface where the filter is disposed in STEP 0. The term "rising" may mean receding from the sensor, and the term "falling" may mean approaching the sensor. FIG. 27B shows an optical path of input light in STEP 1. When the filter is tilted in STEP 1, the optical path of the input light may move 0.25 pixels leftward and 0.25 pixels upward from an optical reference path. Then, the camera module according to an embodiment of the present invention may acquire a first frame image from the optical path moved in STEP 1.

After the driving sequence of the tilt actuator 830 in STEP 1, the tilt actuator 830 may tilt the filter in STEP 2. Due to the tilting in STEP 2, the upper right portion of the filter may rise above the reference surface, and the lower left portion of the filter may fall below the reference surface. The edges of the upper left portion and the lower right portion of the filter that have risen or fallen in STEP 1 may move to reference positions. FIG. 27C shows an optical path of input light in STEP 2. When the filter is tilted in STEP 2, the optical path of the input light may move 0.25 pixels rightward and 0.25 pixels upward from the optical reference path. Based on the optical path of the input light in STEP 1, the optical path of the input light may move 0.5 pixels rightward. Then, the camera module according to an embodiment of the present invention may acquire a second frame image from the optical path moved in STEP 2.

After the driving sequence of the tilt actuator 830 in STEP 2, the tilt actuator 830 may tilt the filter in STEP 3. Due to the tilting in STEP 3, the upper left portion of the filter may fall below the reference surface, and the lower right portion of the filter may rise above the reference surface. The edges of the upper right portion and the lower left portion of the filter that have risen or fallen in STEP 2 may move to reference positions. FIG. 27D shows an optical path of input light in STEP 3. When the filter is tilted in STEP 3, the optical path of the input light may move 0.25 pixels rightward and 0.25 pixels downward from the optical reference path. Based on the optical path of the input light in STEP 2, the optical path of the input light may move 0.5 pixels downward. Then, the camera module according to an embodiment of the present invention may acquire a third frame image from the optical path moved in STEP 3.

After the driving sequence of the tilt actuator 830 in STEP 3, the tilt actuator 830 may tilt the filter in STEP 4. Due to the tilting in STEP 4, the upper right portion of the filter may rise above the reference surface, and the lower left portion of the filter may fall below the reference surface. The edges of the upper left portion and the lower right portion of the filter that have risen or fallen in STEP 3 may move to reference positions. FIG. 27E shows an optical path of input light in STEP 4. When the filter is tilted in STEP 4, the optical path of the input light may move 0.25 pixels leftward and 0.25 pixels downward from the optical reference path. Based on the optical path of the input light in STEP 2, the optical path of the input light may move 0.5 pixels leftward. Then, the camera module according to an embodiment of the present invention may acquire a fourth frame image from the optical path moved in STEP 4.

A voice coil motor (VCM) structure in which a magnet and a coil are applied to a tilt actuator has been described, but the present invention is not limited thereto. The present invention may be implemented through a liquid lens capable of controlling an optical path through control of one or more liquids (conductive liquids and non-conductive liquids that form interfaces) or through a variable lens such as an optical member that controls an optical path by controlling thin films and liquids.

FIG. 29 is a diagram illustrating an SR image.

FIG. 29 illustrates a process of generating one high-resolution SR image using the first to fourth frame images generated through STEPS 1 to 4. For convenience of description, FIG. 29 assumes that each of the first to fourth frame images is a frame image with a size of 4×4, that is, an image including 16 pixels.

As shown in FIG. 29, one SR image may be generated by placing four frame image pixel values according to the moving direction of the optical path. That is, the first to fourth frame images with a size of 4×4 (16 pixels) may become one SR image with a size of 8×8 (64 pixels).

The process of placing the pixel values will be described assuming that the upper left pixels of the first to fourth frames are pixel #1, the lower right pixels of the first to fourth frames are pixel #16, the upper left pixel of the SR image is pixel #1, and the lower right pixel of the SR image is pixel #64.

Pixel #1 of the first frame image that has moved 0.25 pixels leftward and 0.25 pixels upward from the optical reference path may be placed as the value of pixel #1 of the SR image. Pixel #2 of the first frame image may be placed as the value of pixel #3 of the SR image. Pixel #3 of the first frame image may be placed as the value of pixel #5 of the SR image. Pixel #4 of the first frame image may be placed as the value of pixel #7 of the SR image.

Pixel #1 of the second frame image that has moved 0.25 pixels rightward and 0.25 pixels upward from the optical reference path may be placed as the value of pixel #2 of the SR image. Pixel #2 of the second frame image may be placed as the value of pixel #4 of the SR image. Pixel #3 of the second frame image may be placed as the value of pixel #6 of the SR image. Pixel #4 of the second frame image may be placed as the value of pixel #8 of the SR image.

Pixel #1 of the third frame image that has moved 0.25 pixels rightward and 0.25 pixels downward from the optical reference path may be placed as the value of pixel #9 of the SR image. Pixel #2 of the third frame image may be placed as the value of pixel #11 of the SR image. Pixel #3 of the third frame image may be placed as the value of pixel #13 of the SR image. Pixel #4 of the third frame image may be placed as the value of pixel #15 of the SR image.

Pixel #1 of the fourth frame image that has moved 0.25 pixels leftward and 0.25 pixels downward from the optical reference path may be placed as the value of pixel #10 of the SR image. Pixel #2 of the fourth frame image may be placed as the value of pixel #12 of the SR image. Pixel #3 of the fourth frame image may be placed as the value of pixel #14 of the SR image. Pixel #4 of the fourth frame image may be placed as the value of pixel #16 of the SR image.

The pixel values of the first to fourth frame images may be placed in this way to generate one SR image. That is, one image may be acquired through four images. Accordingly, an image with 100 FPS may become an SR image with 25 FPS.

Meanwhile, an image synthesizing part may correct the SR image by removing the outermost pixels of the SR image, that is, pixel values shaded in FIG. 29. Pixel values disposed at the outermost portion of the SR image may include data irrelevant to information to be photographed during the tilting process. The image synthesizing part may remove the shadow of the outermost pixels in order to remove data irrelevant to the information to be photographed.

Although the exemplary embodiments of the present invention have been described with reference to the accompanying drawings, those skilled in the art will appreciate that various modifications and alterations may be made therein without departing from the spirit or essential feature of the present invention. Therefore, the above embodiments are to be regarded as illustrative rather than restrictive.

The invention claimed is:

1. A camera module comprising:
   a light emitter configured to output a light signal to an object;
   a filter configured to allow the light signal to pass therethrough;
   at least one lens disposed above the filter and configured to collect the light signal from the object;
   a housing to support the at least one lens;
   a sensor configured to generate an electric signal from the light signal collected by the lens, the sensor including a plurality of pixels arranged in an array form;
   a tilter configured to tilt the filter to repeatedly move an optical path of the light signal having passed through the filter according to a predetermined rule; and
   an elastic member connecting the housing to the tilter,
   wherein the optical path of the light signal passing through the filter is moved in one direction among diagonal directions of the sensor with respect to an optical path corresponding to the filter being disposed parallel to the sensor.

2. The camera module of claim 1, wherein the predetermined rule includes first to fourth tilt sequences in which the optical path of the light signal having passed through the filter is moved in different diagonal directions.

3. The camera module of claim 2, wherein the tilter tilts the filter to move the optical path of the light signal having passed through the filter toward an upper left portion of the sensor with respect to an optical path corresponding to the filter being disposed parallel to the sensor according to the first tilt sequence.

4. The camera module of claim 2, wherein the tilter tilts the filter to move the optical path of the input light signal having passed through the filter toward an upper right portion of the sensor with respect to an optical path corresponding to the filter being disposed parallel to the sensor according to the second tilt sequence.

5. The camera module of claim 2, wherein the tilter tilts the filter to move the optical path of the input light signal having passed through the filter toward a lower right portion of the sensor with respect to an optical path corresponding to the filter being disposed parallel to the sensor according to the third tilt sequence.

6. The camera module of claim 2, wherein the tilter tilts the filter to move the optical path of the input light signal having passed through the filter toward a lower left portion of the sensor with respect to an optical path corresponding to the filter being disposed parallel to the sensor according to the fourth tilt sequence.

7. The camera module of claim 2, wherein the tilter tilts the filter according to the first tilt sequence such that a line segment formed by a center point and an upper left vertex of the filter forms a positive tilting angle with respect to a reference surface, which is a surface of the filter before the tilting, and a line segment formed by the center point and a lower right vertex of the filter forms a negative tilting angle with respect to the reference surface.

8. The camera module of claim 2, wherein the tilter tilts the filter according to the second tilt sequence such that a line segment formed by a center point and an upper right vertex of the filter forms a positive tilting angle with respect to a reference surface, which is a surface of the filter before the tilting, and a line segment formed by the center point and a lower left vertex of the filter forms a negative tilting angle with respect to the reference surface.

9. The camera module of claim 2, wherein the tilter tilts the filter according to the third tilt sequence such that a line segment formed by a center point and a lower right vertex of the filter forms a positive tilting angle with respect to a reference surface, which is a surface of the filter before the tilting, and a line segment formed by the center point and an upper left vertex of the filter forms a negative tilting angle with respect to the reference surface.

10. The camera module of claim 2, wherein the tilter tilts the filter according to the fourth tilt sequence such that a line segment formed by a center point and a lower left vertex of the filter forms a positive tilting angle with respect to a reference surface, which is a surface of the filter before the tilting, and a line segment formed by the center point and an upper right vertex of the filter forms a negative tilting angle with respect to the reference surface.

11. The camera module of claim 2, wherein the tilter tilts the filter such that the optical path of the light signal is moved in units greater than 0 pixels and less than 1 pixel of the sensor with respect to a predetermined optical reference path.

12. The camera module of claim 2, wherein the tilter tilts the filter to move the optical path of the input light signal having passed through the filter by 0.25 pixels to the left of the sensor and by 0.25 pixels upwards with respect to an optical path corresponding to the filter being disposed parallel to the sensor according to the first tilt sequence.

13. The camera module of claim 2, wherein the tilter tilts the filter to move the optical path of the input light signal having passed through the filter by 0.25 pixels to the right of the sensor and by 0.25 pixels upwards with respect to an optical path corresponding to the filter being disposed parallel to the sensor according to the first tilt sequence.

14. The camera module of claim 2, wherein the tilter tilts the filter to move the optical path of the input light signal having passed through the filter by 0.25 pixels to the right of the sensor and by 0.25 pixels downwards with respect to an optical path corresponding to the filter being disposed parallel to the sensor according to the first tilt sequence.

15. The camera module of claim 2, wherein the tilter tilts the filter to move the optical path of the input light signal having passed through the filter by 0.25 pixels to the left of the sensor and by 0.25 pixels downwards with respect to an optical path corresponding to the filter being disposed parallel to the sensor according to the first tilt sequence.

16. The camera module of claim 2, wherein the tilter tilts the filter by repeating any one combination in which the first to fourth tilt sequences are sequentially arranged.

17. The camera module of claim 2, further comprising an image synthesizer configured to combine images corresponding to the first to fourth tilt sequences to generate a high-resolution image.

18. The camera module of claim 17, wherein the image synthesizer generates the high-resolution image by arranging pixel values of four frame images corresponding to a direction of the movement of the optical path.

19. The camera module of claim 17, wherein the image synthesizer removes a pixel value disposed at an outermost region of the high-resolution image.

* * * * *